US010244165B2

(12) United States Patent
Ono

(10) Patent No.: US 10,244,165 B2
(45) **Date of Patent: *Mar. 26, 2019**

(54) IMAGING DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 206 days.

This patent is subject to a terminal disclaimer.

(21) Appl. No.: 15/368,709

(22) Filed: Dec. 5, 2016

(65) Prior Publication Data

US 2017/0104929 A1 Apr. 13, 2017

Related U.S. Application Data

(63) Continuation of application No. PCT/JP2015/061506, filed on Apr. 14, 2015.

(30) Foreign Application Priority Data

Jun. 27, 2014 (JP) ................................ 2014-132702

(51) Int. Cl.
*G02B 7/02* (2006.01)
*G02B 23/24* (2006.01)
(Continued)

(52) U.S. Cl.
CPC ......... *H04N 5/23238* (2013.01); *G02B 13/00* (2013.01); *G02B 17/08* (2013.01);
(Continued)

(58) Field of Classification Search
CPC ............... H04N 5/2259; H04N 5/2254; H04N 5/23219; H04N 5/23245; H04N 5/23296;
(Continued)

(56) References Cited

U.S. PATENT DOCUMENTS 6,404,455 B1 6/2002 Ito et al.
6,734,911 B1 * 5/2004 Lyons .................... G01S 3/781 348/169
(Continued)

FOREIGN PATENT DOCUMENTS

JP S59-127028 A 7/1984
JP H10-048701 A 2/1998
(Continued)

OTHER PUBLICATIONS

International Search Report issued in PCT/JP2015/061506; dated Jun. 30, 2015.
(Continued)

*Primary Examiner* — Dawayne Pinkney
(74) *Attorney, Agent, or Firm* — Studebaker & Brackett PC

(57) ABSTRACT

An imaging device according to an aspect of the invention includes an imaging optical system (12) having a wide-angle optical system and a telephoto optical system which are provided in different regions, a directional sensor (17) that has a plurality of pixels including photoelectric conversion elements which are two-dimensionally arranged, pupil-divides light beams which are incident through the wide-angle optical system and the telephoto optical system, and selectively receives the beams, a pan/tilt mechanism (32) that moves a direction of an imaging optical axis of the telephoto optical system with respect to a direction of an imaging optical axis of the wide-angle optical system, and an image acquisition unit (22) that acquires a wide-angle image received from the directional sensor (17) through the wide-angle optical system and a telephoto image received from the directional sensor (17) through the telephoto optical system.

20 Claims, 18 Drawing Sheets

(51) Int. Cl.

| | |
|---|---|
| ***G02B 17/00*** | (2006.01) |
| ***H04N 5/232*** | (2006.01) |
| ***G02B 13/00*** | (2006.01) |
| ***G02B 17/08*** | (2006.01) |
| ***G03B 5/02*** | (2006.01) |
| ***G03B 5/04*** | (2006.01) |
| ***G03B 15/00*** | (2006.01) |
| ***G03B 19/07*** | (2006.01) |
| ***G03B 37/00*** | (2006.01) |
| ***H04N 5/225*** | (2006.01) |
| ***G03B 17/12*** | (2006.01) |
| ***G06K 9/20*** | (2006.01) |
| ***G06K 9/32*** | (2006.01) |
| ***G06T 7/20*** | (2017.01) |

(52) U.S. Cl.

CPC ................. *G03B 5/02* (2013.01); *G03B 5/04* (2013.01); *G03B 15/00* (2013.01); *G03B 17/12* (2013.01); *G03B 19/07* (2013.01); *G03B 37/00* (2013.01); *G06K 9/209* (2013.01); *G06K 9/3241* (2013.01); *G06T 7/20* (2013.01); *H04N 5/225* (2013.01); *H04N 5/2254* (2013.01); *H04N 5/232* (2013.01); *H04N 5/23212* (2013.01); *H04N 5/23296* (2013.01); *G03B 2205/0092* (2013.01); *G06K 2209/21* (2013.01); *G06T 2207/10016* (2013.01)

(58) Field of Classification Search

CPC ............... H04N 9/045; H04N 5/23212; H04N 5/23238; H04N 5/225; G02B 17/086; G02B 17/08; G02B 7/021; G02B 13/00; G02B 21/361; G03B 17/00; G03B 13/19608; G03B 13/1963; G03B 15/16; G03B 17/561; G03B 41/00; G03F 7/70225; G03F 7/70233; G11B 7/0932

USPC ................. 359/813, 726, 728, 811, 362–366

See application file for complete search history.

(56) References Cited

U.S. PATENT DOCUMENTS

| | | | | |
|---|---|---|---|---|
| 8,605,197 | B2 | 12/2013 | Ono | |
| 2004/0264013 | A1 | 12/2004 | Matsuki et al. | |
| 2006/0012681 | A1 | 1/2006 | Fujii | |
| 2006/0266835 | A1 | 11/2006 | Tanida | |
| 2008/0117326 | A1 | 5/2008 | Nishio | |
| 2009/0135502 | A1 * | 5/2009 | Border | G02B 17/0896 359/721 |
| 2010/0265331 | A1 | 10/2010 | Tanaka | |
| 2011/0164108 | A1 | 7/2011 | Bates et al. | |
| 2013/0265507 | A1 | 10/2013 | Ford et al. | |
| 2014/0168498 | A1 * | 6/2014 | Ono | G03B 11/00 348/335 |

FOREIGN PATENT DOCUMENTS

| | | | | |
|---|---|---|---|---|
| JP | H11-069342 | A | 3/1999 | |
| JP | 2000-341574 | A | 12/2000 | |
| JP | 2003-510666 | A | 3/2003 | |
| JP | 2003-116029 | A | 4/2003 | |
| JP | 2006-033224 | A | 2/2006 | |
| JP | 2008-129454 | A | 6/2008 | |
| JP | 2009-128527 | A | 6/2009 | |
| JP | 2010-141671 | A | 6/2010 | |
| JP | 2011-505022 | A | 2/2011 | |
| JP | 2012-247645 | A | 12/2012 | |
| JP | 2012-253670 | A | 12/2012 | |
| JP | WO 2013027488 | A1 * | 2/2013 | G03B 11/00 |
| JP | 2013-205781 | A | 10/2013 | |
| WO | 03/042743 | A1 | 5/2003 | |
| WO | 2012/043211 | A1 | 4/2012 | |

OTHER PUBLICATIONS

International Preliminary Report on Patentability issued in PCT/JP2015/061506; completed Sep. 14, 2015.

Extended European Search Report issued by the European Patent Office dated Mar. 10, 2017, which corresponds to European Patent Application No. 15812828.0.

An Office Action; "Notification of Reasons for Refusal" issued by the Japanese Patent Office dated Apr. 27, 2017, which corresponds to Japanese Patent Application No. 2014-132702 and is related to U.S. Appl. No. 15/368,709; with English language translation.

Ford; "Photonic Systems Integration Laboratory"; the Internet <URL: http://psilab.ucsd.edu/research/Telescopic Contact Lens/main.html>; Jacobs School of Engineering; University of California at San Diego, U.S.A.

* cited by examiner

11: IMAGING UNIT

12

IMAGING DEVICE

CROSS-REFERENCE TO RELATED APPLICATIONS

This application is a Continuation of PCT International Application No. PCT/JP2015/061506 filed on Apr. 14, 2015, which claims priority under 35 U.S.C. § 119(a) to Japanese Patent Application No. 2014-132702 filed on Jun. 27, 2014. Each of the above applications is hereby expressly incorporated by reference, in their entirety, into the present application.

BACKGROUND OF THE INVENTION

1. Field of the Invention

The present invention relates to an imaging device, and more particularly, to an imaging device that can acquire a wide-angle image and a telephoto image at the same time.

2. Description of the Related Art

In recent years, an imaging device has been known which can acquire a wide-angle image and a telephoto image at the same time. For example, JP1998-48701A (JP-H10-48701A) discloses an imaging device comprising a wide-angle lens, a telephoto lens, an imaging element (first image sensor) that captures a wide-angle image through the wide-angle lens, and an imaging element (second image sensor) that captures a telephoto image through the telephoto lens. JP2003-116029A discloses an imaging device in which an imaging surface of an imaging element (image sensor) is divided into two regions, a wide-angle image is captured by one region of the imaging surface through a wide-angle lens, and a telephoto image is captured by the other region of the imaging surface through a telephoto lens.

In the imaging device disclosed in JP1998-48701A (JP-H10-48701A), since a wide-angle image and a telephoto image are captured by different image sensors, two image sensors are required. In addition, in the imaging device disclosed in JP1998-48701A (JP-H1048701A), the optical axis of the telephoto lens is shifted such that the wide-angle lens and the telephoto lens are located at different positions, in order to correct the parallax between the wide-angle image captured by the wide-angle lens and the telephoto image captured by the telephoto lens. Therefore, it is difficult to reduce the size and cost of the imaging device. In the imaging device disclosed in JP2003-116029A, the imaging surface of the image sensor is divided into two regions and a wide-angle image and a telephoto image are captured by the two regions. Therefore, it is necessary to increase the size of the image sensor and images are substantially captured by two image sensors. As a result, it is difficult to reduce the size and cost of the imaging device disclosed in JP2003-116029A.

JP2013-205781A discloses an imaging device including an imaging lens that has a plurality of regions (for example, a far focal distance region and a near focal distance region) with different focal lengths or focal distances and an imaging element (directional sensor) that pupil-divides light beams which have passed through the far focal distance region and the near focal distance region, selectively receives the light beams, and captures images. The imaging lens includes a central optical system (wide-angle lens) and an annular optical system (telephoto lens) provided in the periphery of the central optical system which are disposed on the same optical axis (see paragraph 0038 in JP2013-205781A). The imaging device disclosed in JP2013-205781A can pupil-divide light beams which have passed through different regions of the imaging lens and can simultaneously capture a plurality of images (a wide-angle image and a telephoto image) corresponding to the pupil-divided light beams using one image sensor (directional sensor). Therefore, it is possible to reduce the size and cost of the imaging device.

SUMMARY OF THE INVENTION

However, in the imaging device disclosed in JP2013-205781A, the central optical system (wide-angle lens) and the annular optical system (telephoto lens) are disposed on the same optical axis. Therefore, the center of the wide-angle image is constantly aligned with the center of the telephoto image and only the telephoto image in a central portion of the wide-angle image is obtained.

In addition, the imaging optical axes of the wide-angle lens and the telephoto lens are fixed. Therefore, if the telephoto lens is operated to track an object in the imaging device disclosed in JP2013-205781A, the wide-angle lens (wide-angle image) is also operated. In a case in which the position of the telephoto image (the position of the object) is calculated on the basis of the wide-angle image, it is necessary to calculate the amount of correction for a change in the imaging region of the wide-angle image. As a result, calculation becomes complicated. In a case in which the position of the object is detected from only the telephoto image and the object is tracked, the object is likely to be missed according to the moving speed of the object.

The invention has been made in view of the above-mentioned problems and an object of the invention is to provide a small and inexpensive imaging device that is not provided with a plurality of image sensors and can capture a wide-angle image and a telephoto image in an arbitrary region of the wide-angle image at the same time.

In order to achieve the object, according to an aspect of the invention, there is provided an imaging device comprising: an imaging optical system including a wide-angle optical system and a telephoto optical system which are provided in different regions; a directional sensor that includes a plurality of pixels including photoelectric conversion elements which are two-dimensionally arranged, pupil-divides light beams which are incident through the wide-angle optical system and the telephoto optical system, and selectively receives the light beams; a pan/tilt mechanism that moves a direction of an imaging optical axis of the telephoto optical system with respect to a direction of an imaging optical axis of the wide-angle optical system; and an image acquisition unit that acquires a wide-angle image received from the directional sensor through the wide-angle optical system and a telephoto image received from the directional sensor through the telephoto optical system.

According to the above-mentioned aspect of the invention, an imaging unit (single imaging unit) including the imaging optical system and the directional sensor with the above-mentioned structure can acquire a wide-angle image and a telephoto image at the same time. In particular, since the pan/tilt mechanism can move the direction of the imaging optical axis of the telephoto optical system with respect to the wide-angle optical system, it is possible to acquire (capture) a telephoto image in an arbitrary region of a wide-angle image.

According to another aspect of the invention, preferably, the imaging device further comprises: an object detection unit that detects a tracking target object on the basis of at least the wide-angle image, of the wide-angle image and the telephoto image acquired by the image acquisition unit; and a pan/tilt control unit that controls the pan/tilt mechanism on the basis of positional information of the object detected by the object detection unit in an image.

According to the above-mentioned aspect of the invention, the tracking target object is detected on the basis of the wide-angle image and the pan/tilt mechanism is controlled on the basis of the positional information of the detected object in an image. Therefore, it is possible to put the object into the telephoto image (automatically track the object) and it is possible to capture the object using the wide-angle image even if the object moves at a high speed. As a result, tracking dropout does not occur. In addition, since the wide-angle image is fixed, it is possible to easily detect the position of the object which is required to control the pan/tilt mechanism.

According to still another aspect of the invention, in the imaging device, preferably, the object detection unit detects a moving body on the basis of the wide-angle images which are continuously acquired by the image acquisition unit and uses the detected moving body as the tracking target object. Since the tracking target object moves, the detection of the moving body makes it possible to detect a desired object.

According to yet another aspect of the invention, in the imaging device, preferably, the object detection unit recognizes a specific object on the basis of the wide-angle image acquired by the image acquisition unit and uses the recognized specific object as the tracking target object. For example, in a case in which the specific object is a person, it is possible to recognize the person or the face of the person and to detect the tracking target object.

According to still yet another aspect of the invention, in the imaging device, preferably, the pan/tilt control unit controls the pan/tilt mechanism on the basis of the positional information of the object detected by the object detection unit in the image such that the detected object is at least within an angle of view of the telephoto image. In this case, the pan/tilt mechanism may be controlled such that the detected object is located at the center of the telephoto image or the pan/tilt mechanism may be controlled such that the detected object is in a predetermined range in the vicinity of the center of the telephoto image.

According to yet still another aspect of the invention, preferably, the imaging device further comprises a recording unit that records at least the telephoto image, of the wide-angle image and the telephoto image acquired by the image acquisition unit. According to this structure, it is possible to check the recorded telephoto image at a later date. In addition, both the telephoto image and the wide-angle image may be recorded on the recording unit. In this case, it is possible to check the environment around the telephoto image.

According to still yet another aspect of the invention, in the imaging device, preferably, one of the wide-angle optical system and the telephoto optical system of the imaging optical system is a circular central optical system and the other optical system is an annular optical system that is provided concentrically with the central optical system. Since the circular central optical system and the annular optical system have a rotationally symmetric shape, they are preferable as an imaging optical system.

According to yet still another aspect of the invention, in the imaging device, preferably, the annular optical system is the telephoto optical system of the imaging optical system and includes a reflection optical system that reflects the light beam two or more times. According to this structure, it is possible to reduce the dimensions of the annular optical system in the optical axis direction and to reduce the size of the imaging unit.

According to still yet another aspect of the invention, in the imaging device, preferably, the reflection optical system of the telephoto optical system includes at least a main reflection optical system that reflects the light beam and a sub-reflection optical system that further reflects the light beam reflected by the main reflection optical system and the pan/tilt mechanism tilts the main reflection optical system with respect to a light receiving surface of the directional sensor in directions of rotation about two orthogonal axes and tilts the sub-reflection optical system by an angle that is half of a tilt angle of the tilted main reflection optical system. Since the main reflection optical system and the sub-reflection optical system are tilted in this way, the telephoto image can be incident so as to be perpendicular to the light receiving surface of the directional sensor even if the direction of the imaging optical axis of the telephoto optical system is changed.

According to yet still another aspect of the invention, preferably, the imaging device further includes a focus adjustment unit that adjusts a focus of the telephoto optical system. The telephoto optical system has a shallower depth of field than the wide-angle optical system and is more likely to generate blurring than the wide-angle optical system. Therefore, it is preferable to adjust the focus. The focus adjustment unit may also be provided in the wide-angle optical system. Alternatively, the focus adjustment unit may not be provided in the wide-angle optical system and the wide-angle optical system may be in pan focus.

According to still yet another aspect of the invention, in the imaging device, the directional sensor may include a microlens array or a light shielding mask that functions as a pupil division unit.

According to the invention, a single imaging unit can acquire a wide-angle image and a telephoto image at the same time, without any mechanical switching mechanism. Therefore, it is possible to reduce the size and cost of a device. In addition, since the direction of the imaging optical axis of the telephoto optical system can be independently moved, it is possible to capture a telephoto image in an arbitrary region of a wide-angle image.

DESCRIPTION OF THE PREFERRED EMBODIMENTS

Hereinafter, an embodiment of an imaging device according to the invention will be described with reference to the accompanying drawings.

<Outward Appearance of Imaging Device>

Figure 1:
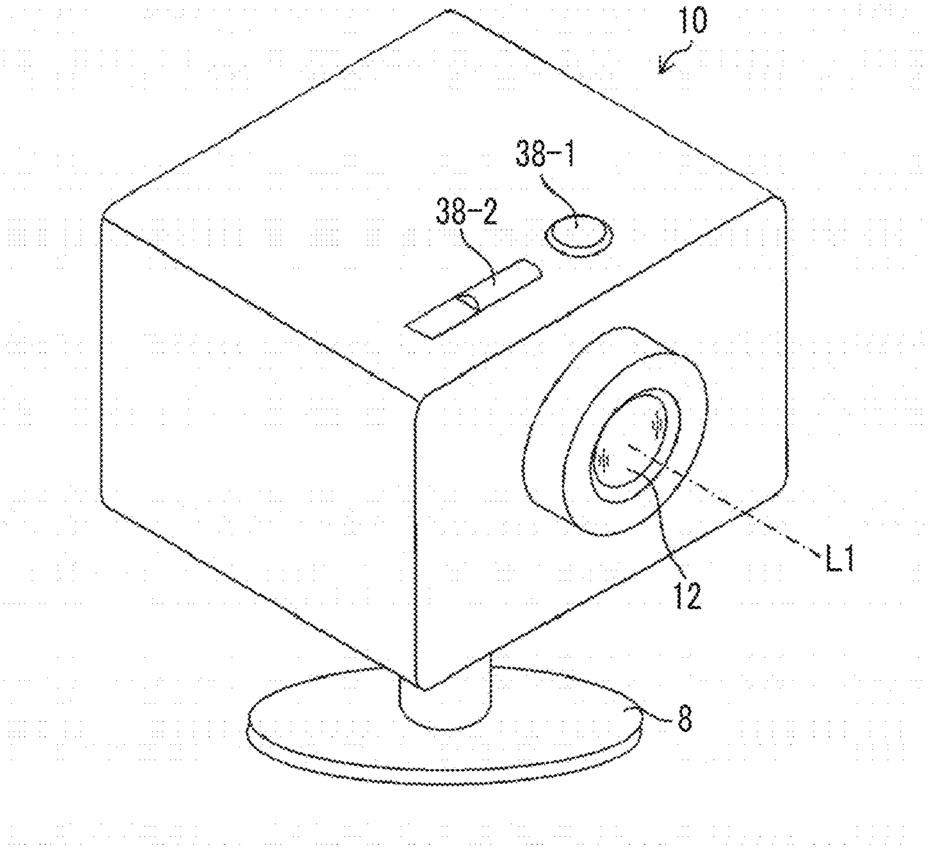
FIG. 1 is a perspective view illustrating the outward appearance of an imaging device according to the invention.

FIG. 1 is a perspective view illustrating the outward appearance of the imaging device according to the invention.

An imaging device 10 illustrated in FIG. 1 is an in-vehicle camera that is provided in a vehicle or a monitoring camera that is provided in a specific place. An imaging optical system 12 is provided on a front surface of the imaging device 10. For example, a recording switch 38-1 and a power switch 38-2 are provided on an upper surface of the imaging device 10. A fixing stage 8 is attached to the bottom of the imaging device 10. L1 indicates an imaging optical axis (hereinafter, simply referred to as an "optical axis") of a wide-angle optical system 13, which will be described below, in the imaging optical system 12.

[Structure of Imaging Unit]

Figure 2:
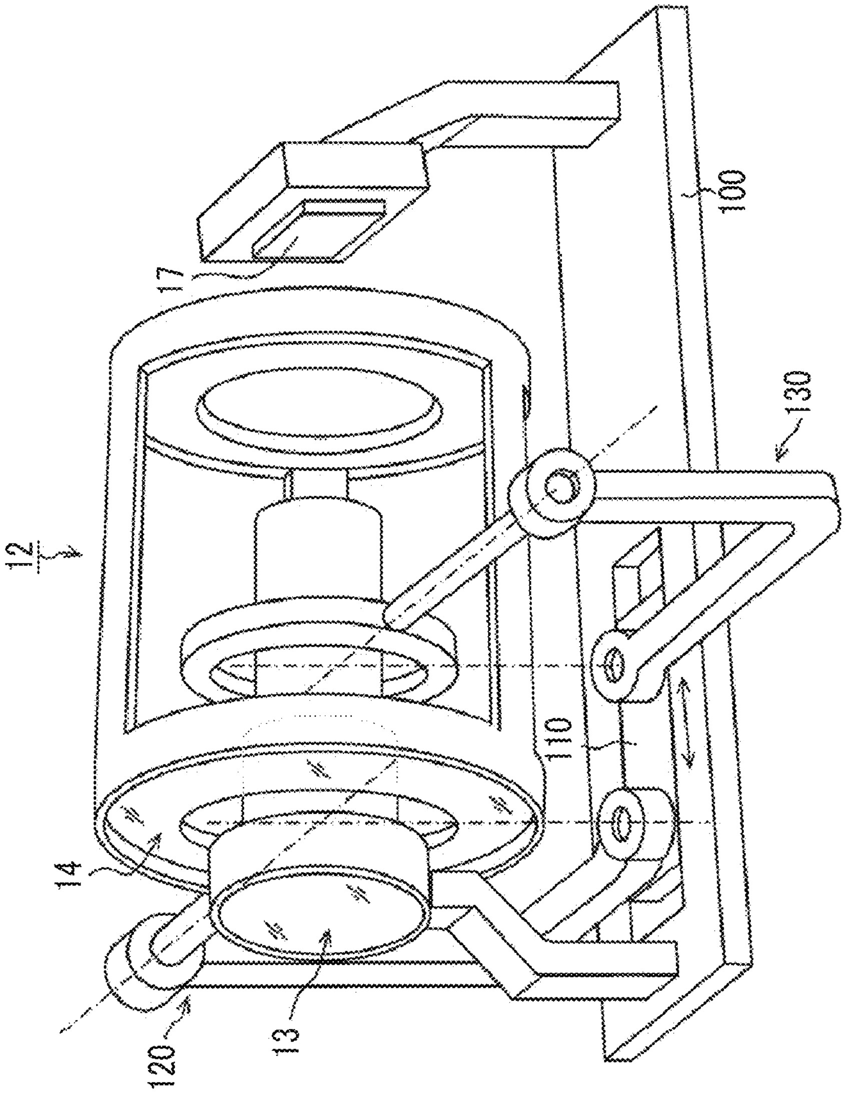
FIG. 2 is a perspective view illustrating a first embodiment of an imaging unit of the imaging device and is a diagram particularly illustrating the structure of a pan/tilt mechanism.

FIG. 2 is a perspective view illustrating a first embodiment of an imaging unit 11 of the imaging device 10 and illustrates the structure of a main portion of a pan/tilt mechanism 32 (FIG. 11) which will be described below.

As illustrated in FIG. 2, the imaging unit 11 includes the imaging optical system 12 and a directional sensor 17.

<Imaging Optical System>

Figure 3:
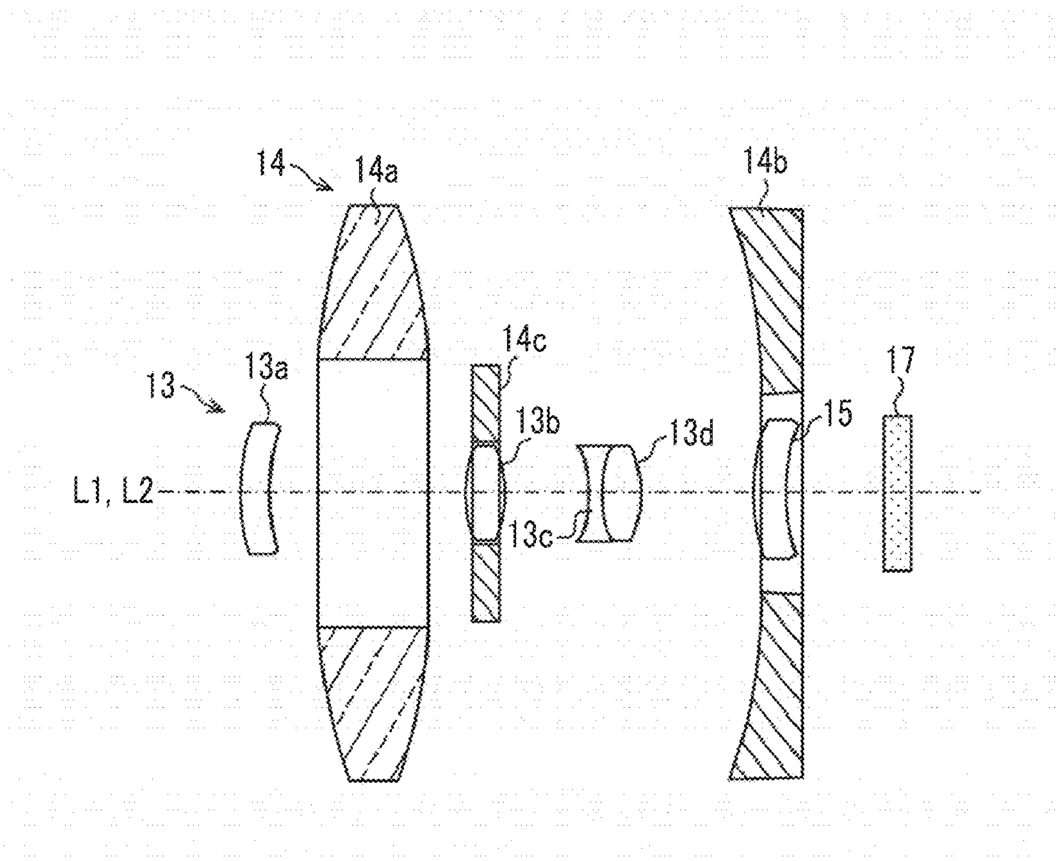
FIG. 3 is a longitudinal sectional view illustrating each optical member of an imaging optical system forming the imaging unit.

FIG. 3 is a longitudinal section view illustrating optical members of the imaging optical system 12.

As illustrated in FIGS. 2 and 3, the imaging optical system 12 includes a wide-angle optical system 13 which is a circular central optical system and a telephoto optical system 14 which is an annular optical system and is provided concentrically with the central optical system (wide-angle optical system 13).

The wide-angle optical system 13 is a wide-angle lens including a first lens 13*a*, a second lens 13*b*, a third lens 13*c*, a fourth lens 13*d*, and a common lens 15 and forms a wide-angle image on the directional sensor 17.

The telephoto optical system 14 is a reflective telephoto lens including a first lens 14*a*, a first reflecting mirror 14*b* as a main reflection optical system, a second reflecting mirror 14*c* as a sub-reflection optical system, and the common lens 15 and forms a telephoto image on the directional sensor 17.

Figure 4:
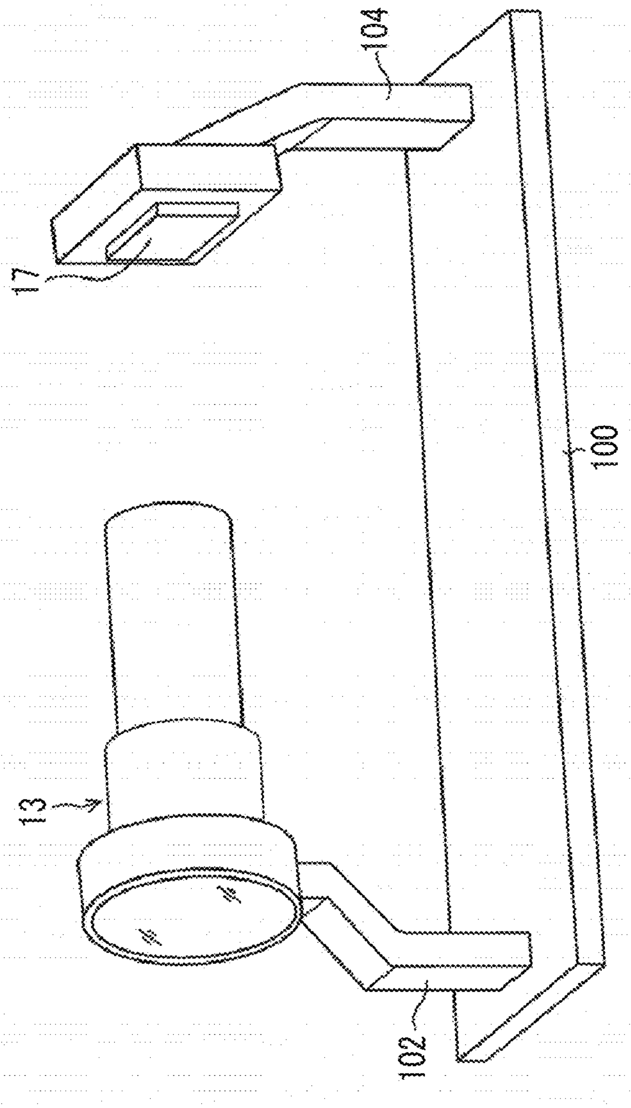
FIG. 4 is a perspective view illustrating a wide-angle optical system in the imaging optical system illustrated in FIG. 2.
Figure 5:
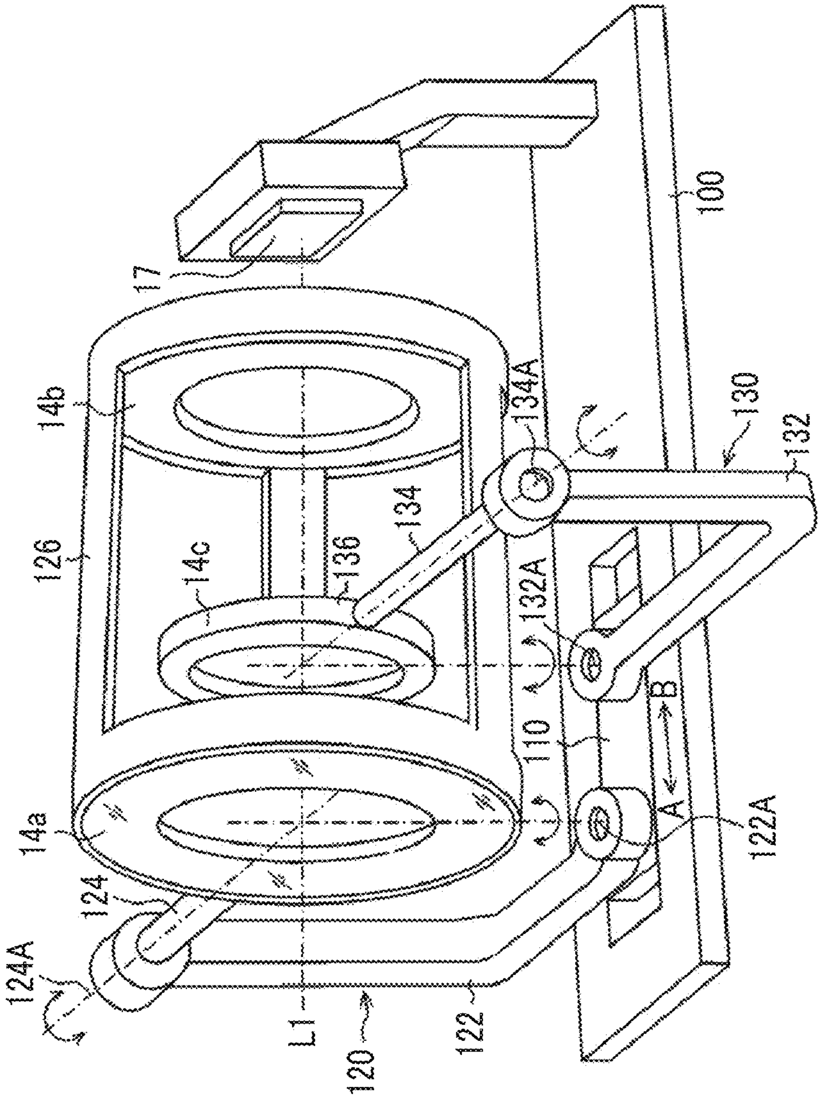
FIG. 5 is a perspective view illustrating a telephoto optical system in the imaging optical system illustrated in FIG. 2.

FIGS. 4 and 5 are diagrams separately illustrating the wide-angle optical system 13 and the telephoto optical system 14 of the imaging optical system 12 illustrated in FIG. 2.

As illustrated in FIG. 4, the wide-angle optical system 13 is supported by a lens supporting portion 102 that is fixed to a base portion 100 in the imaging device 10. The directional sensor 17 is supported by a sensor supporting portion 104 that is fixed to the base portion 100.

The telephoto optical system 14 illustrated in FIG. 5 is supported by a first gimbal mechanism 120 and a second gimbal mechanism 130. The first gimbal mechanism 120 and the second gimbal mechanism 130 are provided in a movable portion 110 that is movable in the direction (the direction of an arrow AB in FIG. 5) of the optical axis L1 of the wide-angle optical system 13 with respect to the base portion 100. Therefore, the movable portion 110 (that is, the telephoto optical system 14) is moved in the direction of the arrow AB with respect to the base portion 100 to adjust the focus of the telephoto optical system 14.

The first gimbal mechanism 120 is a cantilever biaxial gimbal mechanism and includes a first gimbal 122 that pivots above a first axis 122A and a second gimbal 124 that rotates about a second axis 124A. A lens supporting frame 126 is fixed to the second gimbal 124.

The first axis 122A and the second axis 124A of the first gimbal mechanism 120 are two orthogonal axes which are perpendicular to each other in the axis direction and preferably intersect each other on the optical axis of the wide-angle optical system 13. The first lens 14*a* and the first reflecting mirror 14*b* are attached to the lens supporting frame 126.

The second gimbal mechanism 130 is a cantilever biaxial gimbal mechanism, similarly to the first gimbal mechanism 120, and includes a first gimbal 132 that pivots about a first axis 132A and a second gimbal 134 that rotates about a second axis 134A. A mirror supporting frame 136 is fixed to the second gimbal 134.

The first axis 132A and the second axis 134A of the second gimbal mechanism 130 are two orthogonal axes which are perpendicular to each other in the axis direction and preferably intersect each other on the optical axis L of the wide-angle optical system 13. The second reflecting mirror 14*c* is attached to the mirror supporting frame 136.

Figure 6:
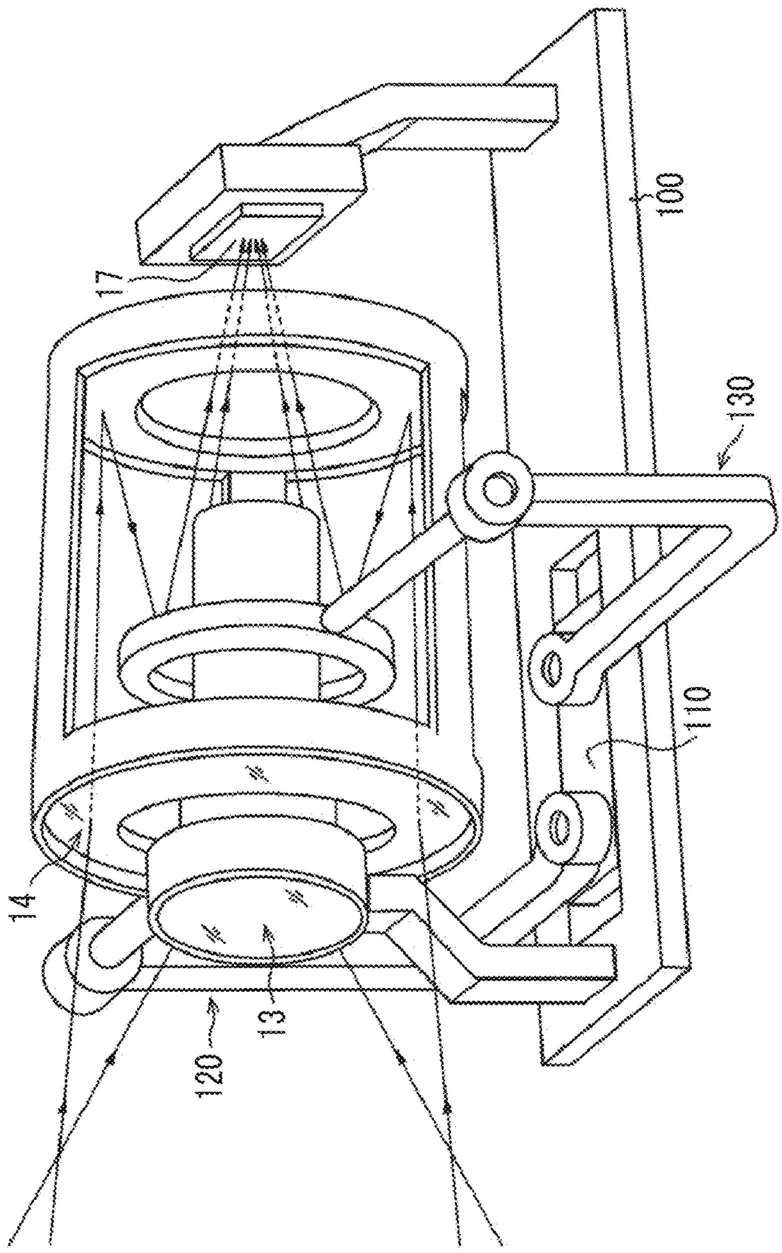
FIG. 6 is a diagram illustrating the imaging optical system illustrated in FIG. 2 to which an optical path is added.

FIG. 6 is a diagram illustrating an optical path of the imaging optical system 12 having the above-mentioned structure.

An object image which is incident through the first lens 13*a* of the wide-angle optical system 13 is formed on the directional sensor 17 through the second lens 13*b*, the third lens 13*c*, the fourth lens 13*d*, and the common lens 15 (see FIG. 3).

An object image which is incident through the first lens 14*a* of the telephoto optical system 14 is reflected two times by the first reflecting mirror 14*b* and the second reflecting mirror 14*c* and is formed on the directional sensor 17 through the common lens 15. Since the object image (light beam) is reflected by the first reflecting mirror 14*b* and the second reflecting mirror 14*c*, the length of the telephoto optical system in the optical axis direction, which is longer than a focal length, is reduced. At least one of the first reflecting mirror 14*b* or the second reflecting mirror 14*c* may be a concave or convex spherical mirror or an aspheric mirror, or may be a planar mirror.

<Pan/Tilt Mechanism>

The pan/tilt mechanism 32 of the imaging device 10 rotates the telephoto optical system 14 in the horizontal direction (pan direction) and the vertical direction (tilt direction) to move the direction of the optical axis L2 of the telephoto optical system 14. For example, as illustrated in FIG. 2, the pan/tilt mechanism 32 includes the first gimbal mechanism 120 and the second gimbal mechanism 130.

The first gimbal mechanism 120 rotates the first gimbal 122 about the first axis 122A to rotate the first lens 14*a* and the first reflecting mirror 14*b* in the direction (pan direction) of rotation about the first axis 122A and rotates the second gimbal 124 about the second axis 124A of the first gimbal mechanism 120 to rotate the first lens 14*a* and the first reflecting mirror 14*b* in the direction (tilt direction) of rotation about the second axis 124A.

The second gimbal mechanism 130 rotates the first gimbal 132 about the first axis 132A to rotate the second reflecting mirror 14*c* in the pan direction and rotates the second gimbal 134 about the second axis 134A of the second gimbal mechanism 130 to rotate the second reflecting mirror 14*c* in the tilt direction.

Figure 7:
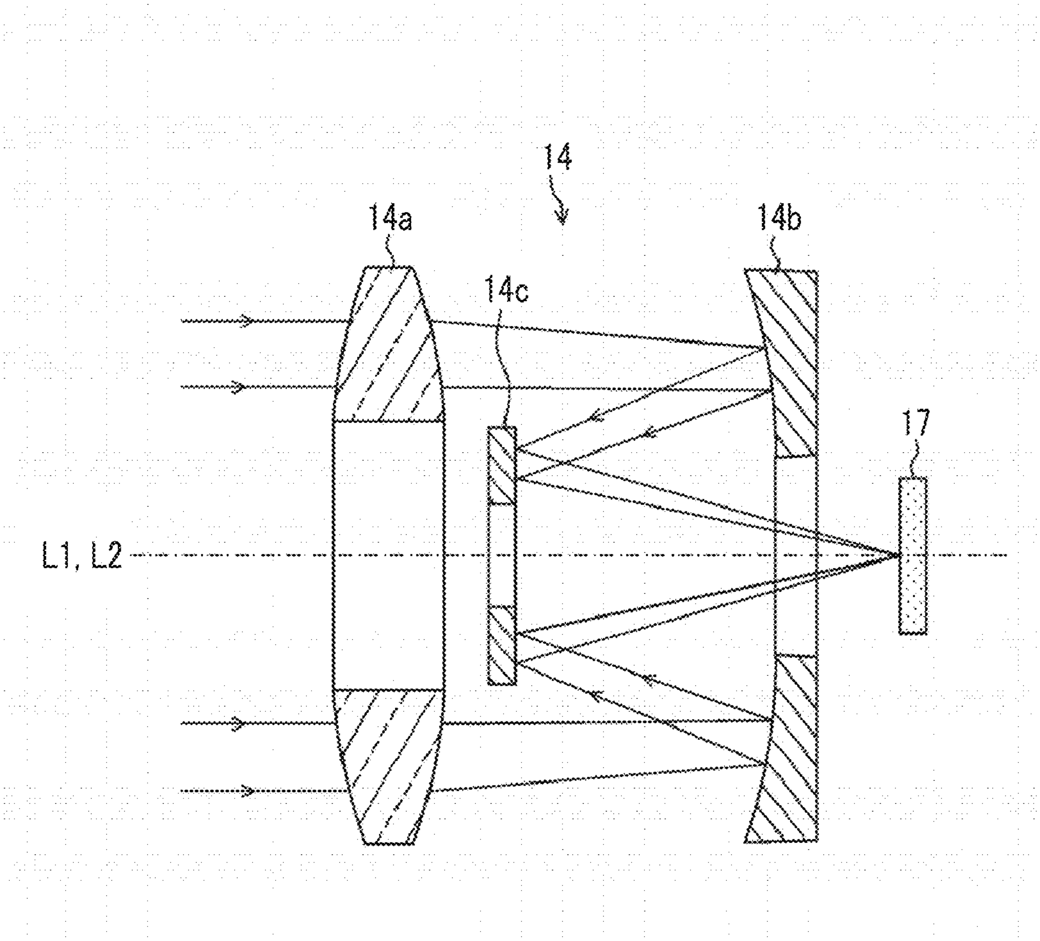
FIG. 7 is a longitudinal sectional view illustrating each optical member of a telephoto optical system in a case in which the optical axis of the wide-angle optical system is aligned with the optical axis of the telephoto optical system.

FIG. 7 is a longitudinal sectional view illustrating each optical member of the telephoto optical system 14 in a case in which the optical axis L1 of the wide-angle optical system is aligned with the optical axis L2 of the telephoto optical system 14.

That is, both the angle (pan angle $\phi$) of the optical axis L2 of the telephoto optical system 14 illustrated in FIG. 7 in the pan direction and the angle (tilt angle $\theta$) thereof in the tilt direction are zero ($\theta=0$, $\phi=0$).

Figure 8:
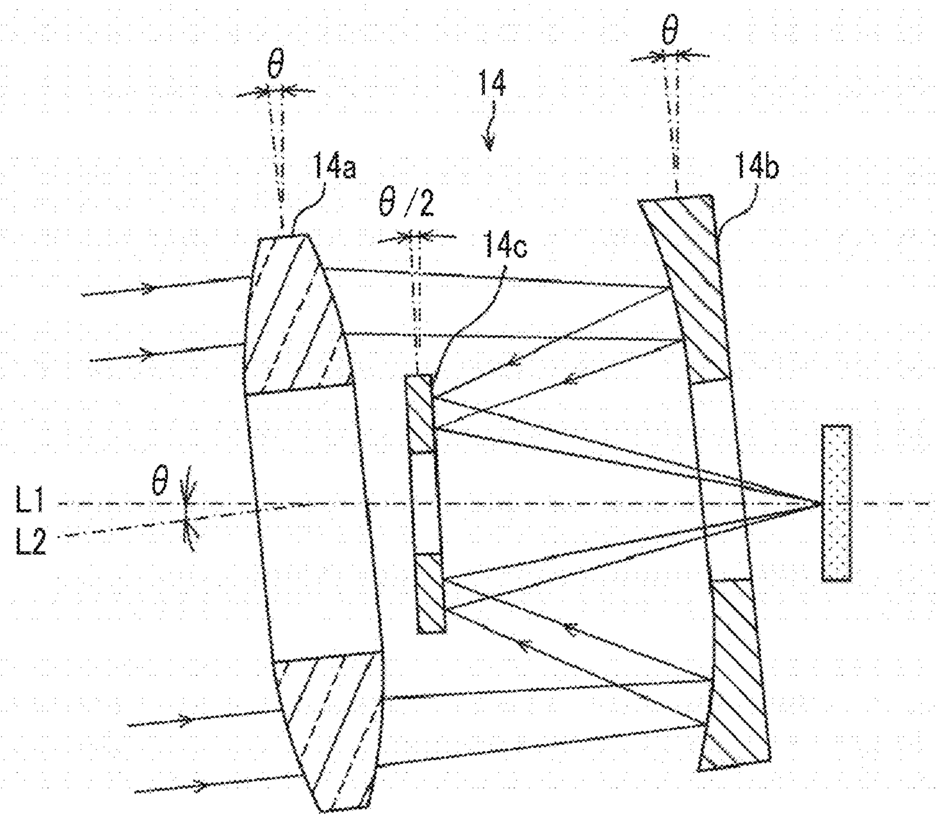
FIG. 8 is a longitudinal sectional view illustrating each optical member of a telephoto optical system in a state in which the optical axis of the telephoto optical system is inclined by a predetermined tilt angle θ.

FIG. 8 is a longitudinal sectional view illustrating each optical member of the telephoto optical system 14 in a state in which the optical axis L2 of the telephoto optical system 14 is inclined by a predetermined tilt angle $\theta$.

As illustrated in FIG. 8, in a case in which the direction of the optical axis L2 of the telephoto optical system 14 is inclined (tilted) downward by the tilt angle $\theta$ with respect to the direction (a direction perpendicular to a light receiving surface of the directional sensor 17) of the optical axis L1 of the wide-angle optical system 13, the second gimbal 124 of the first gimbal mechanism 120 is rotated by the tilt angle $\theta$ to incline the first lens 14*a* and the first reflecting mirror 14*b* by the tilt angle $\theta$ and the second gimbal 134 of the second gimbal mechanism 130 is rotated by an angle $\theta/2$ that is half of the tilt angle $\theta$ to incline the second reflecting mirror 14*c* by the angle $\theta/2$.

As such, the second reflecting mirror 14*c* is inclined by an angle (angle $\theta/2$) that is half of the inclination angle (tilt angle $\theta$) of the first lens 14*a* and the first reflecting mirror 14*b* (that is, optical members including the first reflecting mirror 14*b* and related to the reflection of an object image by the first reflecting mirror 14*b*). Therefore, even if the direction of the optical axis L2 of the telephoto optical system 14 is changed, a telephoto image can be incident on the light receiving surface of the directional sensor 17 so as to be perpendicular to the light receiving surface.

In the example illustrated in FIG. 8, the telephoto optical system 14 is inclined by the tilt angle $\theta$. However, in a case in which the telephoto optical system 14 is inclined by a pan angle $\phi$ (not illustrated) in the horizontal direction, the first gimbal 122 of the first gimbal mechanism 120 is rotated by the pan angle $\phi$ with respect to the direction of the optical axis L1 of the wide-angle optical system 13 to incline the first lens 14*a* and the first reflecting mirror 14*b* by the pan angle $\phi$ and the first gimbal 132 of the second gimbal mechanism 130 is rotated by an angle $\phi/2$ that is half of the pan angle $\phi$ to incline the second reflecting mirror 14*c* by the angle $\phi/2$.

As described above, the telephoto optical system 14 can be panned/tilted to move the direction of the optical axis of the telephoto optical system 14, thereby acquiring (capturing) a telephoto image in an arbitrary region of the wide-angle image.

<Directional Sensor>

Figure 11:
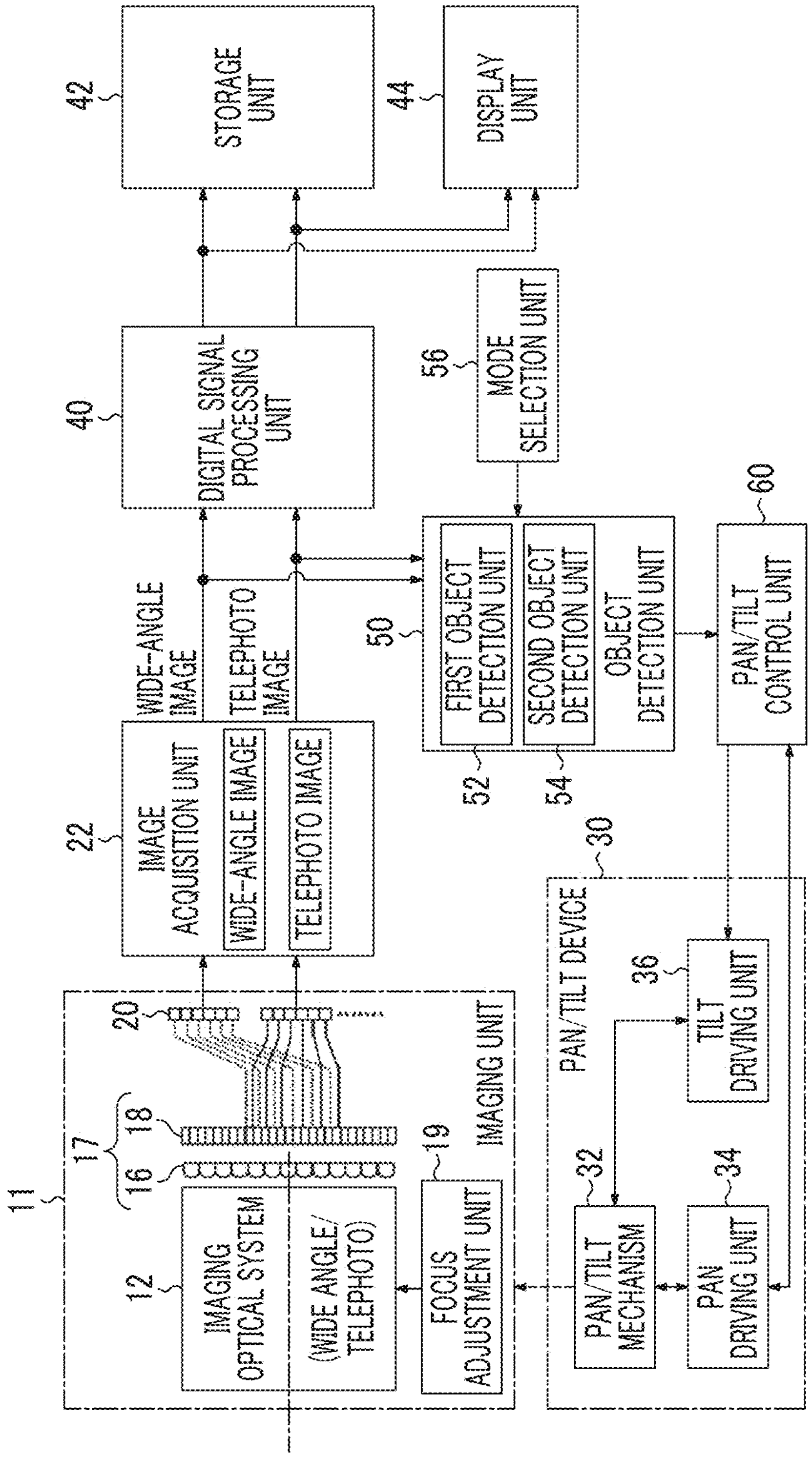
FIG. 11 is a block diagram illustrating an embodiment of the internal structure of the imaging device.

The directional sensor 17 includes a microlens array 16 corresponding to a pupil division unit and an image sensor 18 (see FIG. 11).

Figure 9:
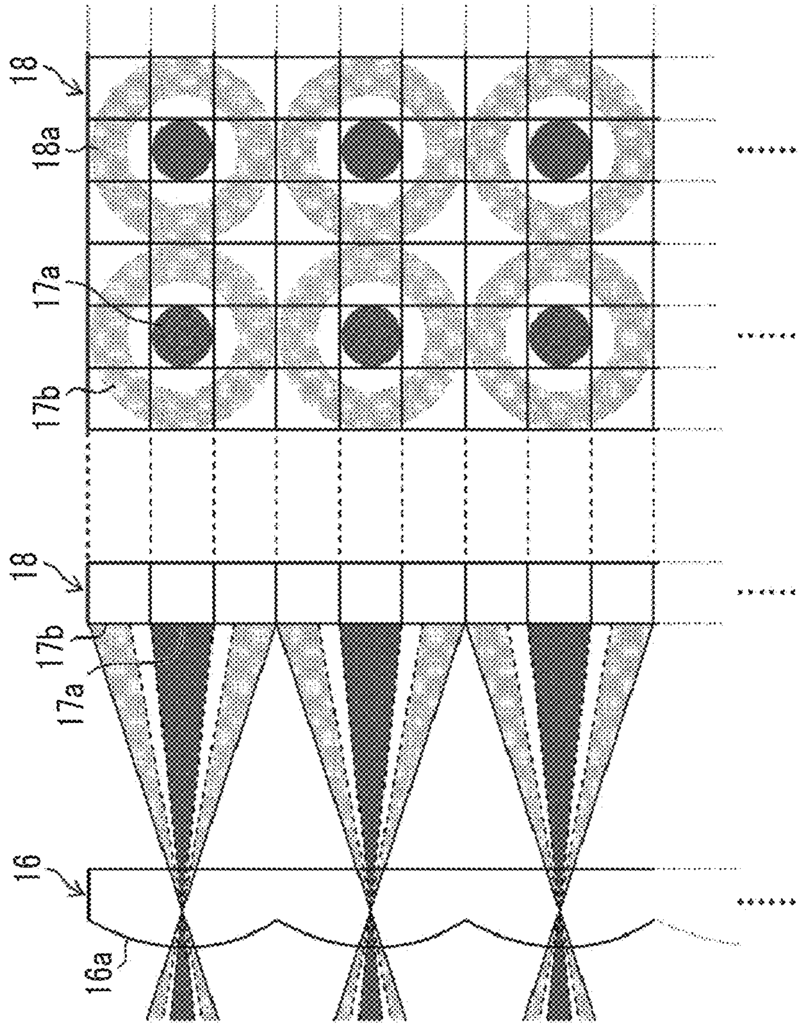
FIG. 9 is an enlarged view illustrating main portions of a microlens array and an image sensor forming a directional sensor.

FIG. 9 is an enlarged view illustrating main portions of the microlens array 16 and the image sensor 18 forming the directional sensor 17 illustrated in FIG. 11.

The microlens array 16 includes a plurality of microlenses (pupil lenses) 16*a* which are two-dimensionally arranged and the length of each microlense in the horizontal direction and the vertical direction corresponds to the length of three light receiving cells 18*a* which are photoelectric conversion elements in the image sensor 18. That is, each microlens of the microlens array 16 is formed so as to correspond to the position of every three light receiving cells in the horizontal direction and the vertical direction.

Each microlens 16*a* of the microlens array 16 forms a circular central pupil image (first pupil image) 17*a* and an annular pupil image (second pupil image) 17*b* which correspond to the wide-angle optical system 13 and the telephoto optical system 14 of the imaging optical system 12, respectively, on the light receiving cells 18*a* in a corresponding light receiving region of the image sensor 18.

According to the microlens array 16 and the image sensor 18 illustrated in FIG. 9, 3×3 light receiving cells 18*a* which are arranged in a lattice shape (square lattice shape) are allocated to each microlens 16*a* of the microlens array 16. Hereinafter, one microlens 16*a* and a light receiving cell group (3×3 light receiving cells 18*a*) corresponding to one microlens 16*a* is referred to as a unit block.

The central pupil image 17*a* is formed on only the central light receiving cell 18*a* of the unit block and the annular pupil image 17*b* is formed on eight peripheral light receiving cells 18*a* of the unit block.

According to the imaging unit 11 having the above-mentioned structure, it is possible to capture a wide-angle image corresponding to the wide-angle optical system 13 and a telephoto image corresponding to the telephoto optical system 14 at the same time, which will be described below.

[Embodiment of Image Sensor]

Figure 10:
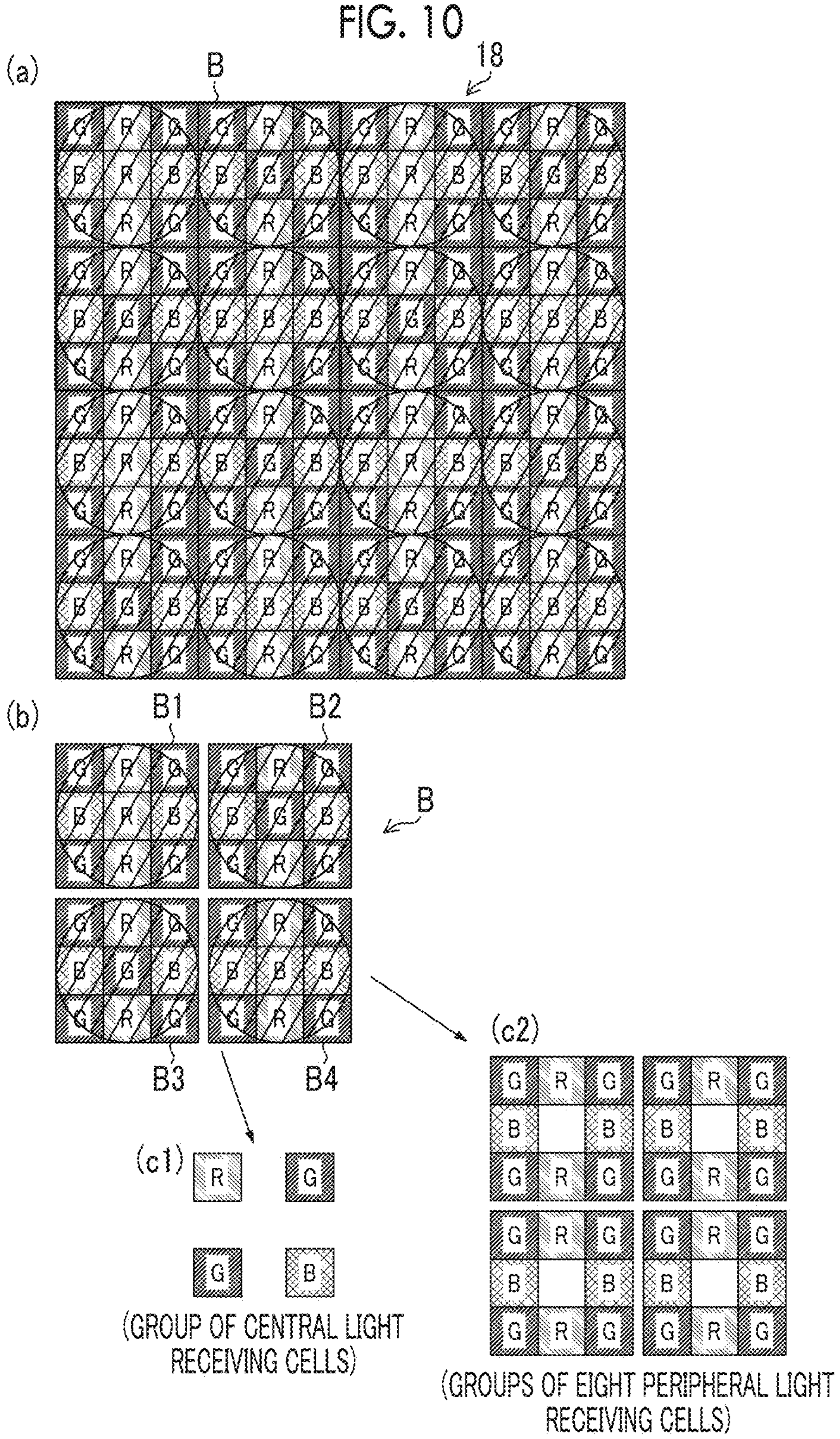
FIG. 10 is a diagram illustrating, for example, a color filter array provided in the image sensor.

FIG. 10 is a diagram illustrating, for example, a color filter array provided in the image sensor 18. However, the microlens array 16 is not illustrated in FIG. 10. A circular region indicates the unit block including 3×3 light receiving cells on which a pupil image is formed by each microlens 16*a* of the microlens array 16.

As illustrated in FIG. 10(*a*), a color filter array which is formed by color filters provided on each light receiving cell is provided on an imaging surface of the image sensor 18.

The color filter array includes three primary color filters (hereinafter, referred to as an R filter, a G filter, and a B filter) which transmit light in red (R), green (G), and blue (B) wavelength ranges. Any one of the R, G, and B filters is provided on each light receiving cell. Hereinafter, a light receiving cell on which the R filter is provided is referred to as an “R light receiving cell”, a light receiving cell on which the G filter is provided is referred to as a “G light receiving cell”, and a light receiving cell on which the B filter is provided is referred to as a “B light receiving cell”.

In the color filter array illustrated in FIG. 10(*a*), 6×6 light receiving cells form a basic block B (a block represented by a thick frame in FIG. 10(*a*); see FIG. 10(*b*)) and the basic blocks B are repeatedly arranged in the horizontal direction and the vertical direction.

As illustrated in FIG. 10(*b*), the basic block B is formed by four unit blocks B1 to B4.

FIGS. 10(*c*1) and 10(*c*2) illustrate a group of central light receiving cells (light receiving cells on which a light beam transmitted through the wide-angle optical system 13 illustrated in FIG. 9 is incident) in four unit blocks B1 to B4 and a group of eight peripheral light receiving cells (light receiving cells on which a light beam transmitted through the telephoto optical system 14 illustrated in FIG. 9 is incident), respectively.

As illustrated in FIG. 10(*c*1), the image of the group of the central light receiving cells is a mosaic image of a Bayer array. Therefore, a demosaicing process is performed for the mosaic image of the Bayer array to obtain a color image.

In contrast, as illustrated in FIG. 10(*c*2), in groups of eight light receiving cells around the central light receiving cell in each of the unit blocks B1 to B4, eight light receiving cells include all of the R, G, and B light receiving cells (the R light receiving cell, the G light receiving cell, and the B light receiving cell). In addition, the R, G, and B light receiving cells are arranged in the same pattern in the unit blocks B1 to B4.

Specifically, four light receiving cells which are provided at four corners of each of the unit blocks B1 to B4 are the G light receiving cells. Two light receiving cells which are provided on the upper and lower sides of the central light receiving cell are the R light receiving cells. Two light receiving cells which are provided on the left and right sides of the central light receiving cell are the B light receiving cells.

The R light receiving cells, the G light receiving cells, and the B light receiving cells are symmetrically provided with respect to the central light receiving cell (center) of each unit block. Therefore, it is possible to generate one pixel (R, G, and B pixel values) forming an image obtained by performing a demosaicing process (synchronization process) for each unit block, using output signals from the R, G, and B light receiving cells in each unit block.

That is, the average value of the output signals (pixel values) from four G light receiving cells in the unit block is calculated to obtain the value of the G pixel at the center of the unit block (one microlens). Similarly, the average value of the pixel values of two R light receiving cells in the unit block is calculated to acquire the value of two R pixel at the center of the unit block and the average value of the pixel values of two B light receiving cells in the unit block is calculated to acquire the value of the B pixel at the center of the unit block.

In this way, it is possible to perform a demosaicing process for a telephoto image corresponding to the telephoto optical system 14, which is generated by eight peripheral light receiving cells of the unit block, using the pixel values of the R, G, and B light receiving cells in the unit block. Therefore, it is not necessary to generate the values of pixels in a specific wavelength range, using the interpolation of the pixel values of the light receiving cells in neighboring unit blocks, and the resolution (a substantial number of pixels) of an output image is not reduced.

<Internal Structure of Imaging Device>

FIG. 11 is a block diagram illustrating an embodiment of the internal structure of the imaging device 10.

As illustrated in FIG. 11, the imaging device 10 comprises the imaging unit 11 including the imaging optical system 12 that has the wide-angle optical system 13 and the telephoto optical system 14 described in, for example, FIG. 2 and the directional sensor 17 that has the microlens array 16 and the image sensor 18 described in FIGS. 9 and 10.

It is preferable that the imaging unit 11 comprises a focus adjustment unit 19 which adjusts the focus of the telephoto optical system 14.

The focus adjustment unit 19 can be, for example, a voice coil motor that moves the movable portion 110 (that is, the entire telephoto optical system 14 or a portion of the optical system) illustrated in, for example, FIG. 2 in the direction of the arrow AB (the direction of the optical axis L1). In addition, whether the telephoto image is in focus can be determined by the contrast of a focus detection region of the telephoto image. However, a focus adjustment method is not limited thereto. A focus adjustment unit may be separately provided in the wide-angle optical system 13 or the wide-angle optical system 13 may be in pan focus.

As illustrated in, for example, FIG. 2, a pan/tilt device 30 comprises a pan/tilt mechanism 32 (that is, a mechanism including the first gimbal mechanism 120 and the second gimbal mechanism 130) that rotates (tilts) the telephoto optical system 14 in the pan direction and the tilt direction, a pan driving unit 34, and a tilt driving unit 36. The pan/tilt mechanism 32 includes an angle detector that detects a rotation angle (pan angle $\phi$) in the pan direction and an inclination angle (tilt angle $\theta$) in the tilt direction. The pan angle $\phi$ and the tilt angle $\theta$ detected by the angle detector can be used as feedback information when pan/tilt control is performed for the pan/tilt device 30.

The pan driving unit 34 and the tilt driving unit 36 each include a servo motor or a stepping motor and a motor driver and output driving force to the pan/tilt mechanism 32 to drive the pan/tilt mechanism 32.

The imaging unit 11 captures wide-angle images and telephoto images in time series through the imaging optical system 12 and the directional sensor 17. An object image which has been formed on the light receiving surface of each light receiving cell (photoelectric conversion element) of the directional sensor 17 (image sensor 18) through the imaging optical system 12 is converted into a signal voltage (or charge) corresponding to the amount of incident light.

The signal voltage (or charge) accumulated in the image sensor 18 is stored in the light receiving cell or a capacitor that is provided in the light receiving cell. A light receiving cell is selected and the stored signal voltage (or charge) is read from the light receiving cell by a MOS imaging element (so-called CMOS sensor) method using an X-Y array system.

In this way, it is possible to read, from the image sensor 18, a pixel signal indicating the wide-angle image of a group of the central light receiving cells corresponding to the wide-angle optical system 13 and a pixel signal indicating the telephoto image of a group of eight peripheral light receiving cells corresponding to the telephoto optical system 14. The pixel signals indicating the wide-angle image and the telephoto image are continuously read from the image sensor 18 at a predetermined frame rate (for example, the number of frames per second is 24 p, 30 p, or 60 p).

For the pixel signal (voltage signal) read from the image sensor 18, the pixel signal from each light receiving cell is sampled and held by a correlated double sampling process (a process of calculating the difference between a feed-through component level and a signal component level included in an output signal from each light receiving cell and obtaining accurate pixel data, in order to reduce, for example, the amount of noise (in particular, thermal noise) included in an output signal from the sensor). Then, the pixel signal is amplified and transmitted to an A/D converter 20. The A/D converter 20 converts the pixel signals which are sequentially input into digital signals and outputs the digital signals to an image acquisition unit 22. In some cases, the A/D converter is provided in a MOS sensor. In this case, the digital signal is directly output from the image sensor 18.

The image acquisition unit 22 selects the position of a light receiving cell in the image sensor 18 and reads a pixel signal therefrom. Therefore, it is possible to simultaneously or selectively acquire the pixel signal indicating the wide-angle image and the pixel signal indicating the telephoto image.

That is, a pixel signal of the light receiving cell on which the central pupil image 17*a* is incident in the image sensor 18 is selectively read. In this way, it is possible to acquire a pixel signal (a pixel signal indicating a mosaic image of the Bayer array) indicating the wide-angle image of one light receiving cell (a central light receiving cell among 3×3 light receiving cells) in each microlens. A pixel signal of the light receiving cell on which the annular pupil image 17*b* is incident in the image sensor 18 is selectively read. In this way, it is possible to acquire a pixel signal indicating the telephoto image of eight light receiving cells (peripheral light receiving cells among 3×3 light receiving cells) in each microlens.

In addition, all of the pixel signals may be read from the image sensor 18 and may be temporarily stored in a buffer memory and the pixel signals stored in the buffer memory may be grouped into the pixel signals of two images, that is, a wide-angle image and a telephoto image.

The pixel signals that indicate the wide-angle image and the telephoto image acquired by the image acquisition unit 22 are output to a digital signal processing unit 40 and an object detection unit 50, respectively.

The digital signal processing unit 40 performs predetermined signal processing, such as an offset process, a gamma correction process, and a demosaicing process for RGB mosaic image signals, for input digital pixel signals (R, G, and B signals in an RGB dot sequential system). Here, the demosaicing process is a process that calculates the information of all colors for each pixel from an RGB mosaic image corresponding to the color filter array of a single-chip image sensor 18 and is also called a synchronization process. For example, in the case of an image sensor 18 including three R, G, and B color filters, the demosaicing process is a process that calculates the information of all of R, G, and B for each pixel from an RGB mosaic image.

That is, since the R light receiving cell and the B light receiving cell are not located at the position of the G light receiving cell in the wide-angle image (the mosaic image of the Bayer array), a demosaicing processing unit included in the digital signal processing unit 40 interpolates the R and B signals of the R and B light receiving cells provided in the vicinity of the G light receiving cell and generates an R signal and a B signal at the positions of the G light receiving cells. Similarly, since the G light receiving cell and the B light receiving cell are not located at the position of the R light receiving cell in the mosaic image, the demosaicing processing unit interpolates the G and B signals of the G and B light receiving cells provided in the vicinity of the R light receiving cell and generates a G signal and a B signal at the positions of the R light receiving cells. In addition, since the G light receiving cell and the R light receiving cell are not located at the position of the B light receiving cell in the mosaic image, the demosaicing processing unit interpolates the G and R signals of the G and R light receiving cells provided in the vicinity of the B light receiving cell and generates a G signal and an R signal at the positions of the B light receiving cells.

As illustrated in FIG. 10(*c*2), the telephoto image includes eight mosaic images (eight peripheral mosaic images in a unit block of 3×3 light receiving cells) per microlens 16*a* and the eight light receiving cells include the color information (the R light receiving cell, the G light receiving cell, and the B light receiving cell) of all of R, G, and B. Therefore, the demosaicing processing unit can generate one pixel (RGB pixel value) forming an image obtained by performing a demosaicing process for each unit block using output signals from eight light receiving cells in the unit block.

Specifically, the demosaicing processing unit which performs the demosaicing process for the mosaic image of the telephoto image calculates the average value of the pixel values of four G light receiving cells in the unit block to calculate the value of the G pixel at the center of the unit block (one microlens). Similarly, the demosaicing processing unit calculates the average value of the pixel values of two R light receiving cells in the unit block to calculate the value of the R pixel at the center of the unit block and calculates the average value of the pixel values of two B light receiving cells in the unit block to calculate the value of the B pixel at the center of the unit block.

Of two demosaic images of the wide-angle image and the telephoto image generated by the demosaicing processing unit, the resolution of the demosaic image of the telephoto image is substantially higher than that of the demosaic image of the wide-angle image subjected to the demosaicing process using (interpolating) the output signals from the light receiving cells in neighboring unit blocks since the demosaic image of the telephoto image has been subjected to the demosaicing process using the output signals from eight light receiving cells in the unit block.

The digital signal processing unit 40 performs, for example, RGB/YC conversion for generating a brightness signal Y and color difference signals Cb and Cr from R, G, and B color information (the R signal, the G signal, and the B signal), which has been subjected to the demosaicing process by the demosaicing processing unit, to generate moving image recording image signals and moving image display image signals indicating a wide-angle image and a telephoto image with a predetermined frame rate.

The image signals indicating the wide-angle image and the telephoto image processed by the digital signal processing unit 40 are to a recording unit 42 and a display unit 44. The recording unit 42 records the moving image recording image signals indicating the wide-angle image and the telephoto image processed by the digital signal processing unit 40 on a recording medium (for example, a hard disk or a memory card). The recording unit 42 may record only the telephoto image.

The display unit 44 displays the wide-angle image and the telephoto image on the basis of the moving image display image signals indicating the wide-angle image and the telephoto image processed by the digital signal processing unit 40. The display unit 44 may reproduce the wide-angle image and the telephoto image on the basis of the image signals recorded on the recording unit 42.

The object detection unit 50 detects a tracking target object on the basis of the pixel signals indicating the wide-angle image and the telephoto image acquired by the image acquisition unit 22 and outputs the positional information of the detected object in the image to a pan/tilt control unit 60. The object detection unit 50 includes a first object detection unit 52 that detects the object on the basis of the telephoto image and detects the positional information of the object in the wide-angle image and a second object detection unit 54 that detects the object on the basis of the telephoto image and detects the positional information of the object in the telephoto image.

A method for detecting the object in the first object detection unit 52 and the second object detection unit 54, the following methods is used: a method that detects a specific object using an object recognition technique typified by a technique for recognizing the face of a person; or a moving body detection method that detects a moving body as the tracking target object.

The object detection method using object recognition registers the visual characteristics of a specific object as an object dictionary in advance, cuts out an image from a captured image while changing the position or size of the image, and compares the cut image with the object dictionary to recognize the object.

Figure 12:
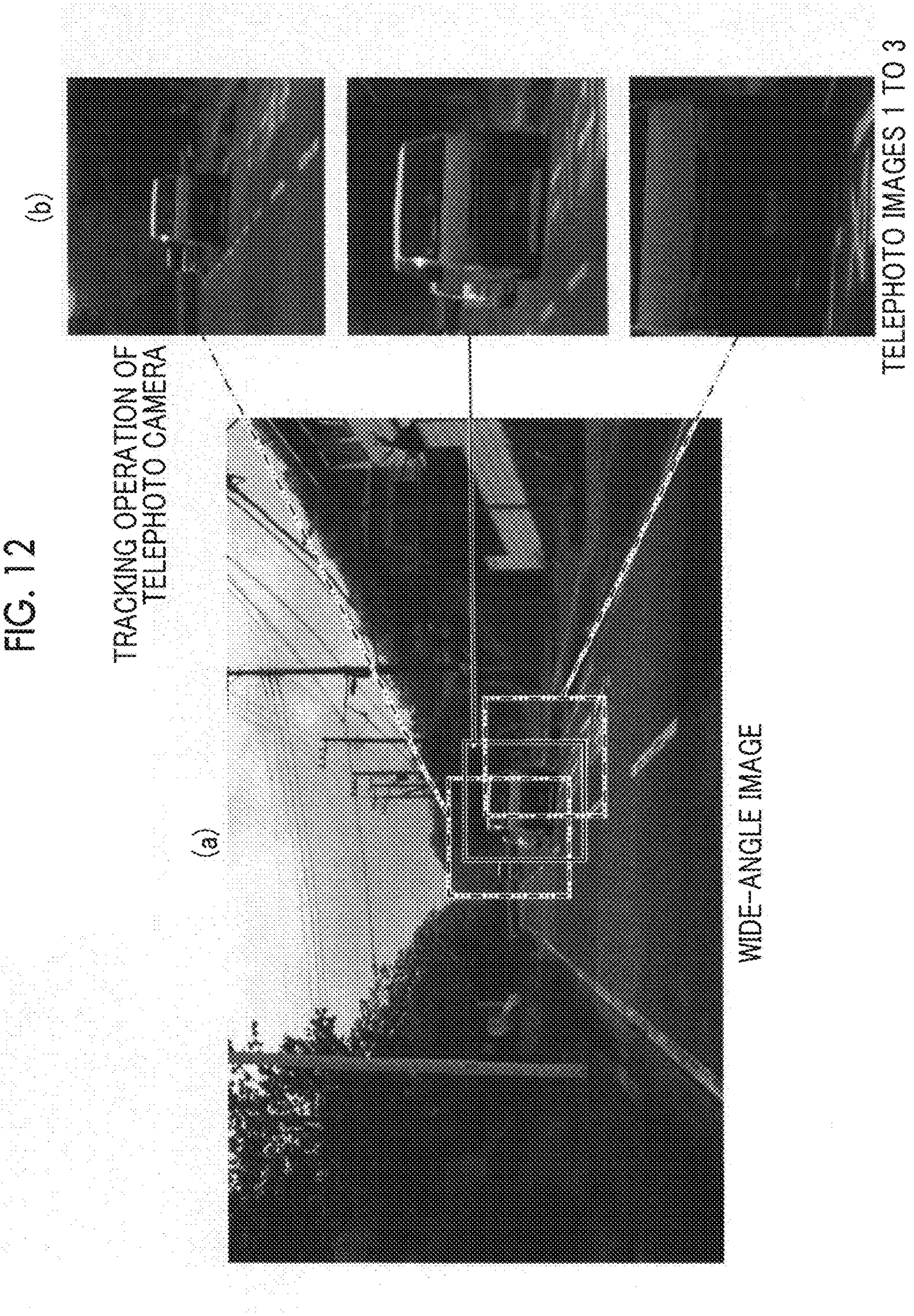
FIG. 12 is a diagram illustrating examples of a captured wide-angle image and a captured telephoto image.

FIGS. 12(*a*) and 12(*b*) are diagrams illustrating examples of a captured wide-angle image and a captured telephoto image. In the wide-angle image, a region which is surrounded by a frame represented by a solid line indicates the current imaging range of the telephoto image and regions which are surrounded by frames represented by a two-dot chain line indicate the past and future imaging ranges of the telephoto image.

In a case in which the wide-angle image and the telephoto image illustrated in FIGS. 12(*a*) and 12(*b*) are captured and a specific object (a specific car (minivan) in the example illustrated in FIG. 12) is a tracking target, the first object detection unit 52 can detect the position of the minivan in the wide-angle image as long as the minivan is captured in the angle of view of the wide-angle image.

The second object detection unit 54 can detect the position of the minivan in the telephoto image as long as the minivan is captured in the angle of view of the telephoto image.

However, in a case in which a portion of or the entire minivan is not captured in the angle of view of the telephoto image according to the automatic tracking performance of the pan/tilt device 30 of the speed of the object (minivan), it is difficult to recognize the minivan and to detect the position of the minivan in the telephoto image.

The object detection unit 50 (the first object detection unit 52 second the object detection unit 54) detects a tracking target object on the basis of at least the wide-angle image of the wide-angle image and the telephoto image. Therefore, even if the object moves at a high speed, it is possible to capture the object using the wide-angle image and tracking dropout does not occur.

Positional information indicating the position of the object in the wide-angle image which is detected by the first object detection unit 52 and positional information indicating the position of the object in the telephoto image which is detected by the second object detection unit 54 are transmitted to the pan/tilt control unit 60.

In this example, a mode selection unit 56 that selects a first tracking mode or a second tracking mode is provided. In the first tracking mode, only the positional information indicating the position of the object in the wide-angle image which is detected by the first object detection unit 52 is output to the pan/tilt control unit 60 and the pan/tilt device 30 is controlled on the basis of the positional information of the object in the wide-angle image. In the second tracking mode, both the first object detection unit 52 and the second object detection unit 54 are used, the positional information indicating the position of the object in the telephoto image which is detected by the second object detection unit 54 is also output to the pan/tilt control unit 60, and the pan/tilt device 30 is controlled on the basis of the positional information of the object in the wide-angle image and the positional information indicating the position of the object in the telephoto image.

As described above, the pan/tilt control unit 60 controls the pan/tilt device 30 on the basis of the positional information indicating the position of the object in the image (the wide-angle image and the telephoto image) input from the object detection unit 50 and controls the pan/tilt mechanism 32 (that is, the direction of the optical axis L2 of the telephoto optical system 14) through the pan driving unit 34 and the tilt driving unit 36 such that the position of the object (for example, the position of the center of gravity of a tracking target object or the position of a characteristic portion of the object) in the image is moved to the position of the center of the telephoto image (a position on the optical axis L2 of the telephoto optical system 14).

The pan/tilt mechanism 32 can be controlled to automatically track the object such that the tracking target object is located at the center of the telephoto image. The invention is not limited to the case in which tracking control is performed such that the position (the position of the center of gravity) of the object in the image is located at the center of the telephoto image. For example, the pan/tilt mechanism 32 may be controlled such that the position (the position of the center of gravity) of the object in the image is at least within the angle of view the telephoto image (preferably, a predetermined range in the vicinity of the center of the telephoto image (for example, within the focus detection region)).

Next, as the method for detecting the object in the first object detection unit 52 and the second object detection unit 54, an example of the moving body detection method that detects a moving body as the tracking target object will be described.

Figure 13A:
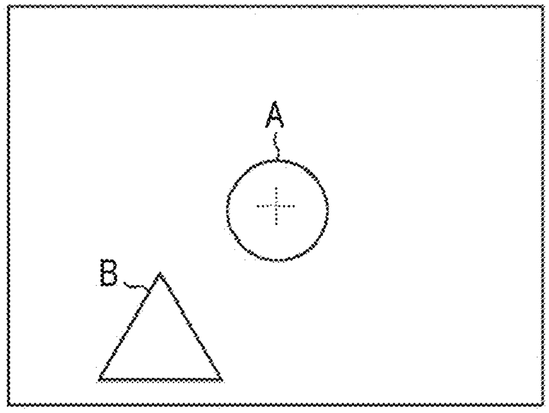
FIGS. 13A to 13C are diagrams illustrating an example of a moving body detection method for detecting a moving body as a tracking target object.
Figure 13B:
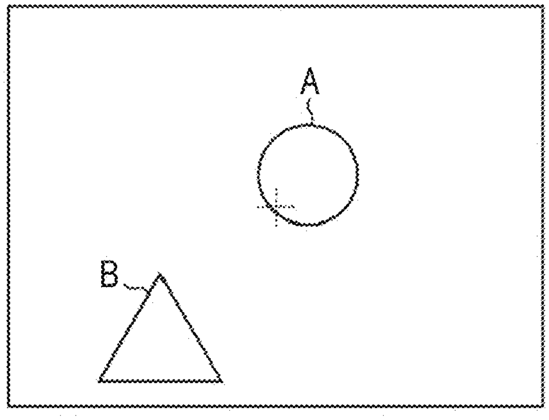
Figure 13C:
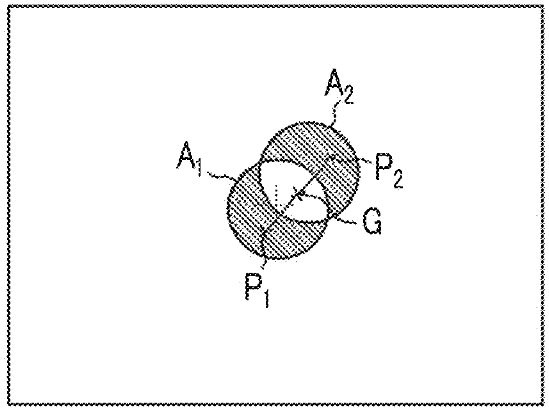

In this case, as illustrated in FIGS. 13A to 13C, the first object detection unit 52 detects a difference image (FIG. 13C) indicating the difference between two time-series wide-angle images (a previously acquired wide-angle image (FIG. 13A) and a currently acquired wide-angle image (FIG. 13B)).

In the example illustrated in FIGS. 13A and 13B, of objects A and B, the object A moves and the object B remains stationary.

Therefore, as illustrated in FIG. 13C, difference images $A_1$ and $A_2$ are generated by the movement of the object A.

Here, the positions of the centers of the gravity of the difference images $A_1$ and $A_2$ are calculated as positions $P_1$ and $P_2$ and the middle point of a line connecting the positions $P_1$ and $P_2$ is referred to as a position G. The position G is used as the position of the moving body (object A) in the wide-angle image.

The pan/tilt mechanism 32 (that is, the direction of the optical axis L2 of the telephoto optical system 14) is repeatedly controlled such that the calculated position G of the object A in the wide-angle image is moved to the position of the center of the telephoto image (a position on the optical axis L2). In this way, the object A is moved (converges on) to the position of the center of the telephoto image.

Similarly to the first object detection unit 52, the second object detection unit 54 can detects the tracking target object (moving body) on the basis of the telephoto image and can detect the position of the object in the wide-angle image. In a case in which the imaging unit 11 is moved (the imaging device 10 moved by the vehicle provided with the imaging device 10), the backgrounds of time-series images are also moved. In this case, the images are shifted such that the backgrounds of the time-series images are matched with each other and a difference image between the shifted images is calculated. In this way, it is possible to detect an object that is moving in a real space, regardless of the movement of the imaging unit 11.

In addition, the moving body detection method is not limited to the above-described embodiment.

<Automatic Tracking Control Method>

Figure 14:
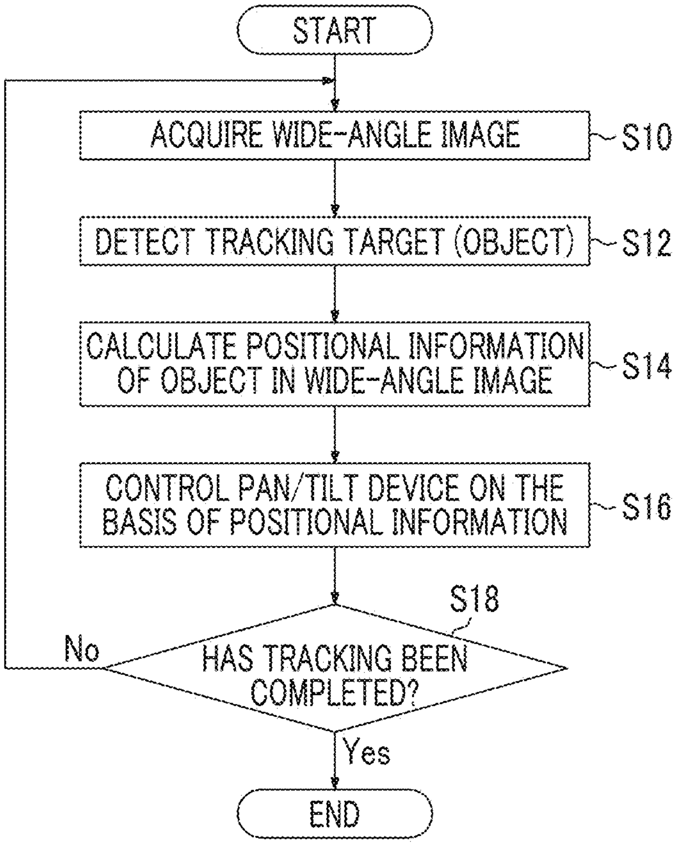
FIG. 14 is a flowchart illustrating an example of an automatic tracking control method by the imaging device according to the invention.

FIG. 14 is a flowchart illustrating the automatic tracking control method by the imaging device according to the invention and illustrates a case in which the mode selection unit 56 selects the first tracking mode.

In FIG. 14, the first object detection unit 52 acquires a wide-angle image from the image acquisition unit 22 (Step S10) and detects a tracking target object from the acquired wide-angle image (Step S12).

Then, the first object detection unit 52 calculates positional information indicating the position of the detected object in the wide-angle image (Step S14).

Then, the pan/tilt control unit 60 receives the positional information indicating the position of the object in the wide-angle image from the first object detection unit 52 and controls the pan/tilt device 30 on the basis of the received positional information such that the object is located at the center of the telephoto image (Step S16).

In a general photographic lens, the position of an image is proportional to a tangent function (tan) of the incident angle of light. Therefore, for example, in a case in which the position of the object from the center of the image in the pan direction is x, when the optical system is rotated by the pan angle $\phi$ represented by the following expression, it is possible to capture the object at the center of the optical axis of the optical system:

$$\phi=\arctan(x/A). \quad \text{[Expression 1]}$$

In the above-mentioned [Expression 1], A is a constant corresponding to the focal length. In a case in which the pan angle $\phi$ is shifted from the function represented by [Expression 1] by the aberration of the lens or a deliberate design, the optical system may be rotated by an angle including the amount of shift. In addition, in a case in which the object moves (displaces) from the center of the image center in the tilt direction, it is possible to calculate the tilt angle $\theta$ of the optical system for capturing the object at the center of the optical axis of the optical system, as described above. When the optical system is rotated (tilted) by the pan angle $\theta$, it is possible to capture the object at the center of the optical axis of the optical system.

Then, it is determined whether automatic tracking imaging had been completed (Step S18). When it is determined that the automatic tracking imaging has not been completed, the process proceeds to Step S10. Then, a process from Step S10 to Step S18 is repeated to automatically track the object and to capture the image of the object. On the other hand, when it is determined that the automatic tracking imaging has not been completed, the automatic tracking imaging ends. In addition, whether automatic tracking imaging has been completed may be determined by turning on and off power or by a switch input indicating whether to perform the automatic tracking imaging.

Figure 15:
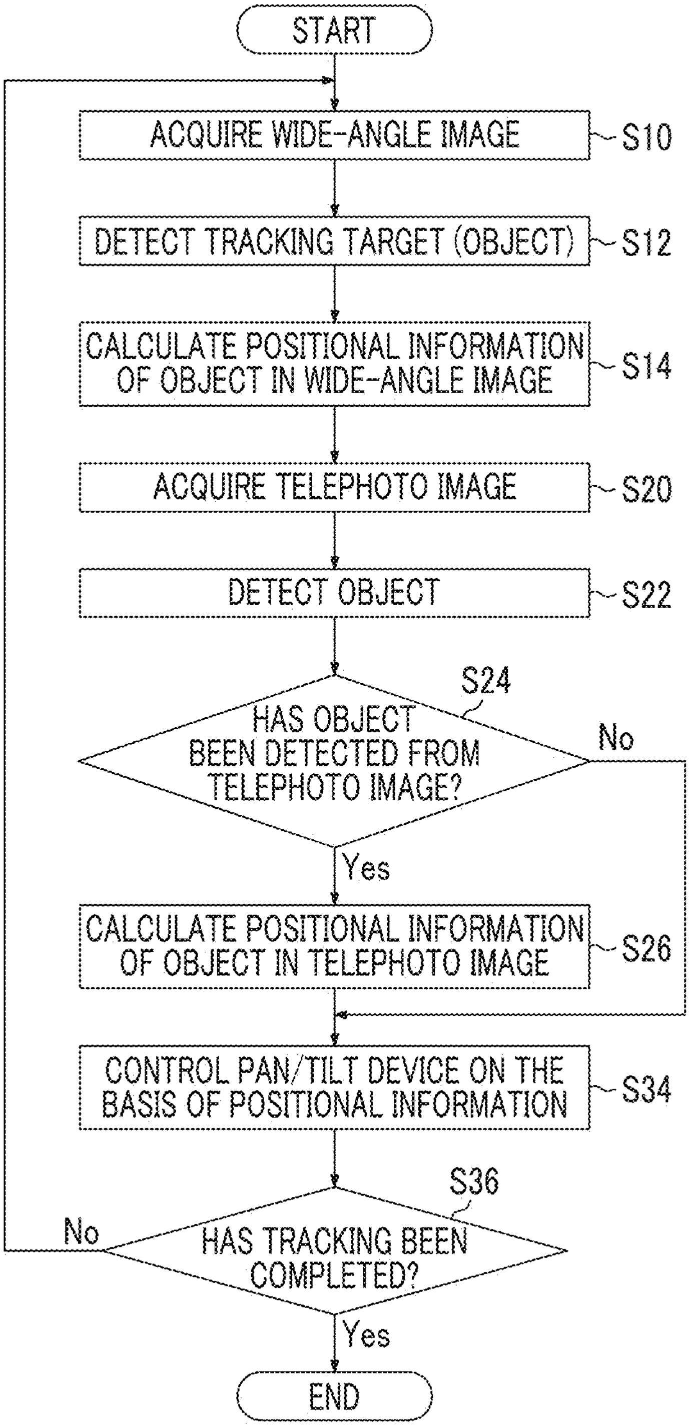
FIG. 15 is a flowchart illustrating another example of the automatic tracking control method by the imaging device according to the invention.

FIG. 15 is a flowchart illustrating another example of the automatic tracking control method by the imaging device according to the invention and illustrates a case in which the mode selection unit 56 selects the second tracking mode.

In FIG. 15, in Steps S10, S12, and S14, the same process as that in Steps S10, S12, and S14 illustrated in FIG. 14 is performed.

Then, the second object detection unit 54 acquires a telephoto image from the image acquisition unit 22 (Step S20) and detects a tracking target object from the acquired telephoto image (Step S22).

Then, the second object detection unit 54 determines whether an object has been detected in Step S22 (Step S24). In a case in which an object has been detected (in the case of "Yes"), the second object detection unit 54 calculates positional information indicating the position of the detected object in the telephoto image (Step S26). On the other hand, in a case in which an object has not been detected (in the case of "No"), the process proceeds to Step S34.

Then, the pan/tilt control unit 60 receives the positional information of the object in the wide-angle image detected in Step S14, the positional information of the object in the telephoto image detected in Step S22, and the current pan angle and tilt angle $\theta$ of the pan/tilt mechanism 32 detected by the angle detector and controls the pan/tilt device 30 on the basis of the received positional information and angle information such that the object is located at the position of the center of the telephoto image (Step S34).

Here, in a case in which it is determined in Step S24 that an object has not been detected from the telephoto image, the pan/tilt control unit 60 controls the pan/tilt device 30 on the basis of the positional information of the object in the wide-angle image detected in Step S14 such that the object is located at the position of the center of the telephoto image. On the other hand, in a case in which it is determined in Step S24 that an object has been detected from the telephoto image, the pan/tilt control unit 60 controls the pan/tilt device 30 on the basis of the pan angle $\phi$ and the tilt angle $\theta$ when the telephoto image is acquired and the positional information of the object in the telephoto image detected in Step S26 such that the object is located at the position of the center of the telephoto image. The use of the positional information of the object in the telephoto image makes it possible to automatically track the object with high accuracy.

Then, it is determined whether automatic tracking imaging has been completed (Step S36). When it is determined whether automatic tracking imaging has not been completed, the process proceeds to Step S10. Then, the process from Step S10 to Step S36 is repeatedly performed to automatically track an object and to capture the image of the object. On the other hand, when it is determined whether automatic tracking imaging has been completed, the automatic tracking imaging ends.

<Another Embodiment of Directional Sensor>

Figure 16:
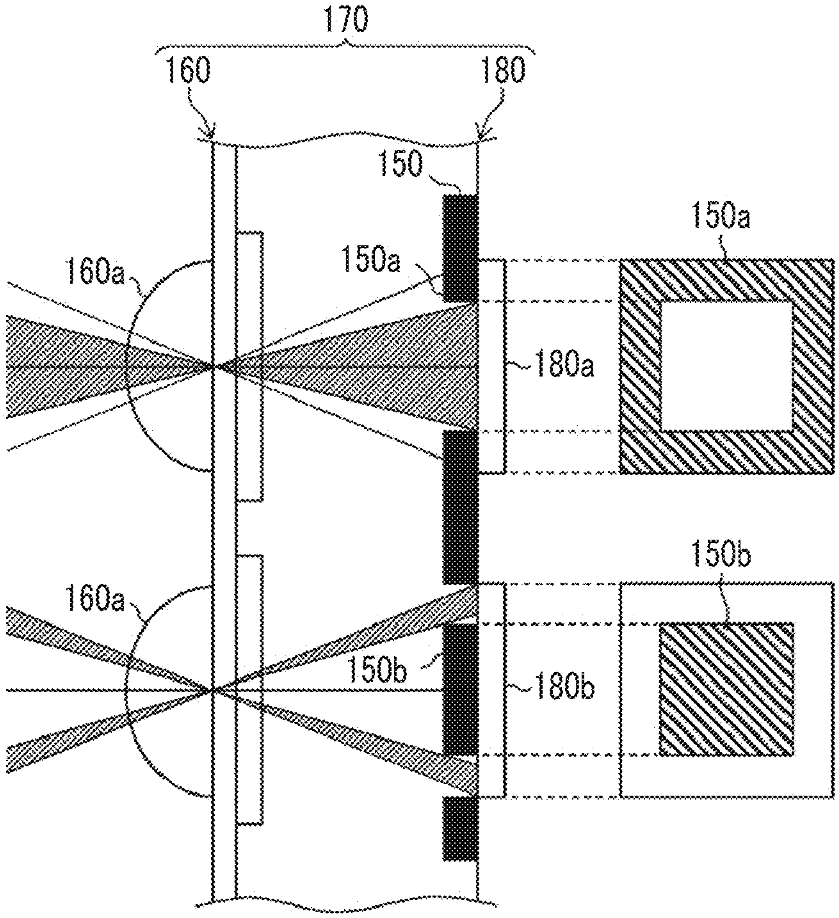
FIG. 16 is a side view illustrating another embodiment of the directional sensor.

FIG. 16 is a side view illustrating another embodiment of the directional sensor.

A directional sensor 170 includes a microlens array 160 corresponding to a pupil division unit, a light shielding member 150 functioning as a light shielding mask, and an image sensor 180 including light receiving cells 180*a* and 180*b* which are partially shielded by the light shielding member 150. The light receiving cell 180*a* and the light receiving cell 180*b* which are partially shielded by the light shielding member 150 are alternately (checkered shape) provided in the horizontal direction and the vertical direction of the image sensor 180.

The microlens array 160 includes microlenses 160*a* that are in one-to-one correspondence with the light receiving cells 180*a* and 180*b* of the image sensor 180.

The light shielding member 150 regulates the openings of the light receiving cells 180*a* and 180*b* of the image sensor 180 and has an opening shape corresponding to the wide-angle optical system 13 and the telephoto optical system 14 of the imaging optical system 12 illustrated in, for example, FIG. 2. Red (R), green (G), and blue (B) color filters are provided below each lens of the microlens array 160.

A peripheral portion of the opening of the light receiving cell 180*a* is shielded by the light shielding portion 150*a* of the light shielding member 150 and a central portion of the opening of the light receiving cell 180*b* is shielded by the light shielding portion 150*b* of the light shielding member 150. Therefore, the light beam that has passed through the wide-angle optical system 13 of the imaging optical system 12 is pupil-divided by the microlens array 160 and the light shielding portion 150*a* of the light shielding member 150 and is incident on the light receiving cell 180*a*. The light beam that has passed through the telephoto optical system 14 of the imaging optical system 12 is pupil-divided by the microlens array 160 and the light shielding portion 150*b* of the light shielding member 150 and is incident on the light receiving cell 180*b*.

Therefore, it is possible to read a pixel signal of a wide-angle image from each light receiving cell 180*a* of the image sensor 180 and to read a pixel signal of a telephoto image from each light receiving cell 180*b* of the image sensor 180.

<Another Embodiment of Imaging Unit>

Next, another embodiment of the imaging unit used in the imaging device according to the invention will be described.

Figure 17:
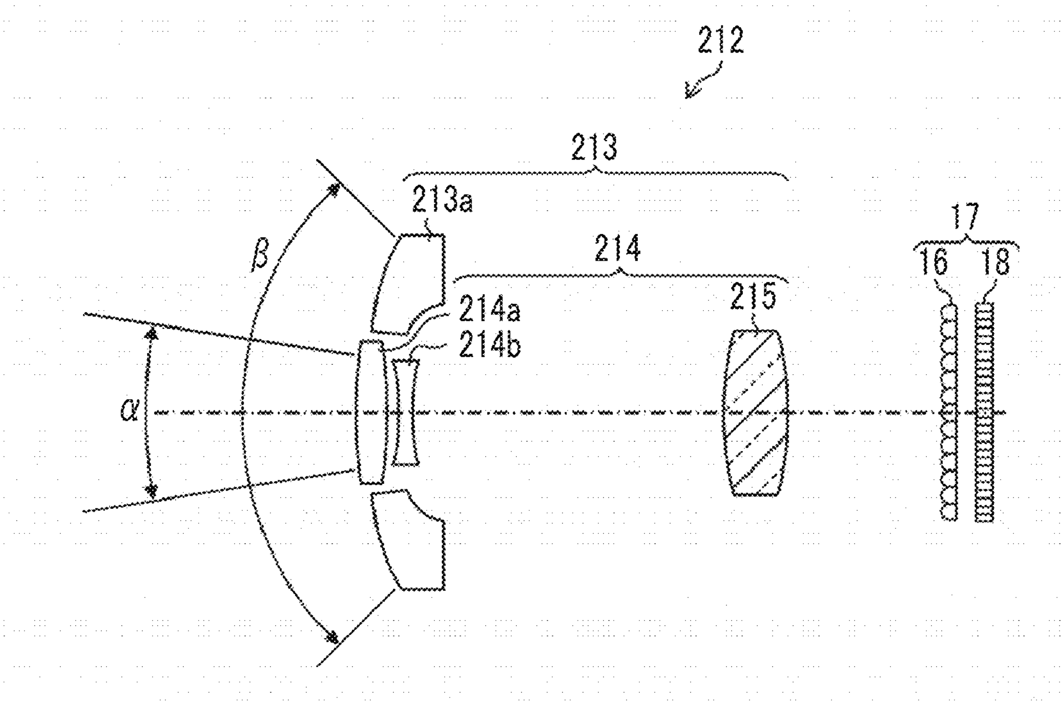
FIG. 17 is a cross-sectional view illustrating another embodiment of the imaging unit which is applied to the imaging device.

FIG. 17 is a cross-sectional view illustrating another embodiment of the imaging unit that can be applied to the imaging device 10.

The imaging unit includes an imaging optical system 212 and a directional sensor 17. Since the directional sensor 17 is the same as that illustrated in FIG. 3, only the imaging optical system 212 will be described below.

The imaging optical system 212 includes a telephoto optical system 214 which is a circular central optical system and a wide-angle optical system 213 which is an annular optical system and is provided in the periphery of the central optical system (telephoto optical system 214) so as to be concentric with the central optical system.

The telephoto optical system 214 includes a first lens 214*a*, a second lens 214*b*, and a common lens 215 and has an angle of view $\alpha$.

The wide-angle optical system 213 includes a lens 213*a* and the common lens 215 and has an angle of view $\beta$ ($\beta>\alpha$) that is greater than that of the telephoto optical system 214.

The imaging optical system 212 differs from the imaging optical system 12 illustrated in, for example, FIG. 2 in that no reflecting mirror is used, the circular central optical system is the telephoto optical system 214, and the annular optical system which is provided concentrically with the central optical system is the wide-angle optical system 213.

Of course, the telephoto optical system 214 which is a central optical system is configured such that the direction of the optical axis of the telephoto optical system 214 can be moved with respect to the direction of the optical axis of the wide-angle optical system 213.

Another embodiment of the imaging device 10 may be, for example, a mobile phone, a smart phone, a personal digital assistant (PDA), or a portable game machine with a camera function. Hereinafter, a smart phone will be described in detail as an example of the imaging device with reference to the drawings.

<Structure of Smart Phone>

Figure 18:
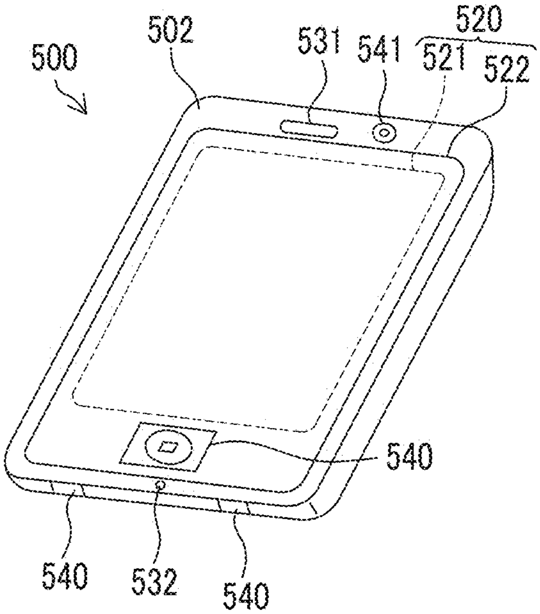
FIG. 18 is a diagram illustrating the outward appearance of a smart phone which is another embodiment of the imaging device.

FIG. 18 is a diagram illustrating the outward appearance of a smart phone 500 which is another embodiment of the imaging device 10. The smart phone 500 illustrated in FIG. 18 includes a housing 502 with a flat panel shape and a display input unit 520 having a display panel 521 as a display unit and an operation panel 522 as an input unit which are integrally formed on one surface of the housing 502. The housing 502 includes a speaker 531, a microphone 532, an operating unit 540, and a camera unit 541. However, the configuration of the housing 502 is not limited thereto. For example, the display unit and the input unit may be independently provided, or the housing 502 may have a folding structure or a sliding structure.

Figure 19:
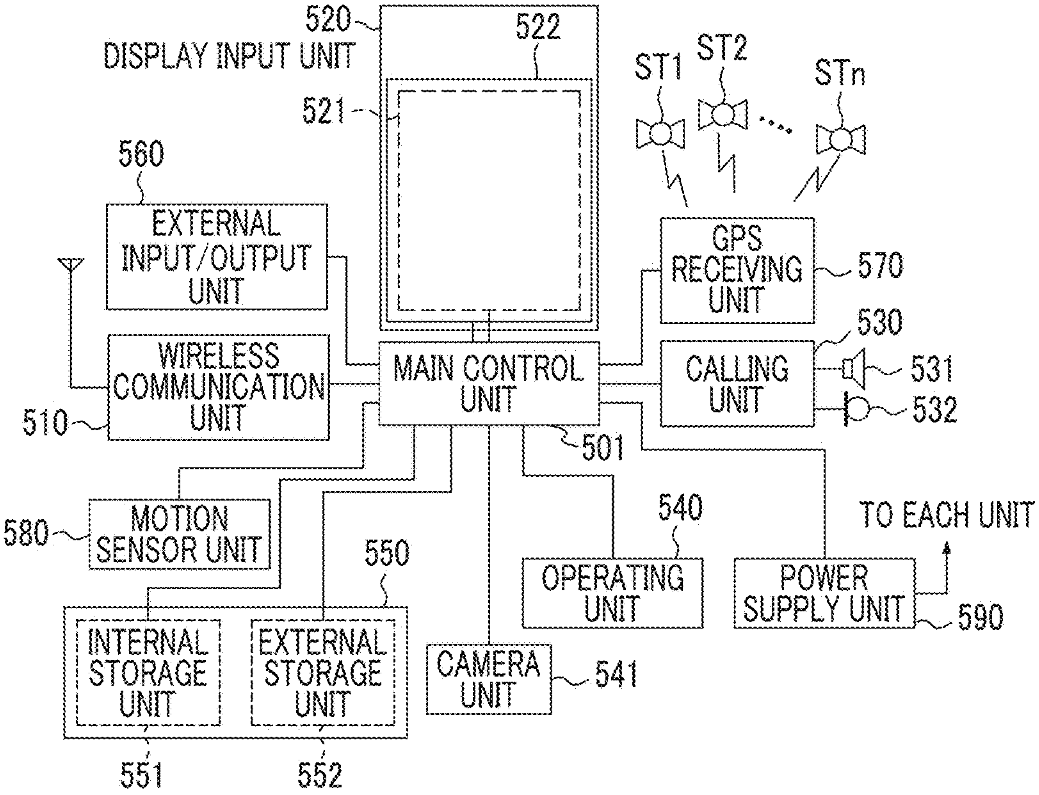
FIG. 19 is a block diagram illustrating the structure of a main portion of the smart phone.

FIG. 19 is a block diagram illustrating the structure of the smart phone 500 illustrated in FIG. 18. As illustrated in FIG. 19, the smart phone 500 comprises, as main components, a wireless communication unit 510, the display input unit 520, a calling unit 530, the operating unit 540, the camera unit 541, a storage unit 550, an external input/output unit 560, a global positioning system (GPS) receiving unit 570, a motion sensor unit 580, a power supply unit 590, and a main control unit 501. In addition, the smart phone 500 has, as a main function, a wireless communication function which performs mobile wireless communication through a base station apparatus BS and a mobile communication network NW.

The wireless communication unit 510 performs wireless communication with the base station apparatus BS which is accommodated in the mobile communication network NW in response to an instruction from the main control unit 501. The wireless communication is used to transmit and receive various types of file data, such as voice data and image data, and electronic mail data or to receive, for example, web data or streaming data.

The display input unit 520 is a so-called touch panel that displays, for example, images (still images and moving images) or text information to visually transmit information to the user and detects the user's operation for the displayed information under the control of the main control unit 501 and comprises the display panel 521 and the operation panel 522. It is preferable that the display panel 521 is a 3D display panel in a case in which a generated 3D image is viewed.

The display panel 521 uses, for example, a liquid crystal display (LCD) or an organic electro-luminescence display (OELD) as a display device.

The operation panel 522 is a device that is provided such that an image displayed on a display surface of the display panel 521 is visually recognized and detects one or a plurality of coordinate points operated by a finger of the user or a stylus. When the device is operated by a finger of the user or a stylus, a detection signal which is generated by the operation is output to the main control unit 501. Then, the main control unit 501 detects an operation position (coordinates) on the display panel 521 on the basis of the received detection signal.

As illustrated in FIG. 18, the display panel 521 and the operation panel 522 of the smart phone 500 are integrated to form the display input unit 520 and the operation panel 522 is provided so as to completely cover the display panel 521. In a case in which this structure is used, the operation panel 522 may have a function of detecting the user's operation even in a region other than the display panel 521. In other words, the operation panel 522 may comprise a detection region (hereinafter, referred to as a display region) for an overlap portion which overlaps the display panel 521 and a detection region (hereinafter, referred to as a non-display region) for an outer edge portion which does not overlap the display panel 521.

The size of the display region may be exactly equal to the size of the display panel 521. However, the sizes are not necessarily equal to each other. The operation panel 522 may comprise two sensitive regions, that is, an outer edge portion and an inner portion other than the outer edge portion. The width of the outer edge portion is appropriately designed according to, for example, the size of the housing 502. Examples of a position detecting method which is used in the operation panel 522 include a matrix switching method, a resistive film method, a surface elastic wave method, an infrared method, an electromagnetic induction method, and a capacitive sensing method. Any of the methods may be used.

The calling unit 530 comprises the speaker 531 and the microphone 532. The calling unit 530 converts the voice of the user which is input through the microphone 532 into voice data which can be processed by the main control unit 501 and outputs the converted voice data to the main control unit 501. In addition, the calling unit 530 decodes voice data received by the wireless communication unit 510 or the external input/output unit 560 and outputs the decoded voice data from the speaker 531. As illustrated in FIG. 18, for example, the speaker 531 and the microphone 532 can be mounted on the same surface as the display input unit 520.

The operating unit 540 is a hardware key which uses, for example, a key switch and receives instructions from the user. For example, the operating unit 540 is a push button switch which is mounted on a lower portion and a lower surface of the display unit of the housing 502 of the smart phone 500, is turned on when it is pressed by, for example, a finger, and is turned off by the restoring force of a spring when the finger is taken off.

The storage unit 550 stores a control program or control data of the main control unit 501, address data which is associated with, for example, the names or phone numbers of communication partners, and transmitted and received electronic mail data, web data which is downloaded by web browsing, or downloaded content data. In addition, the storage unit 550 temporarily stores, for example, streaming data. The storage unit 550 includes an internal storage unit 551 which is provided in the smart phone and an external storage unit 552 which has a detachable external memory slot. The internal storage unit 551 and the external storage unit 552 forming the storage unit 550 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 560 functions as an interface with all of the external apparatuses connected to the smart phone 500 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB) (registered trademark) network or a ZigBee (registered trademark) network).

Examples of the external apparatus connected to the smart phone 500 include a wired/wireless headset, a wired/wireless external charger, a wired/wireless data port, a memory card which is connected through a card socket, a subscriber identity module (SIM) card/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit can transmit data which is received from the external apparatus to each component of the smart phone 500 or can transmit data in the smart phone 500 to the external apparatus.

The GPS receiving unit 570 receives GPS signals transmitted from GPS satellites ST1 to STn and performs a position measurement process on the basis of a plurality of received GPS signals to detect a position including the latitude, longitude, and height of the smart phone 500, in response to an instruction from the main control unit 501. When the GPS receiving unit 570 can acquire positional information from the wireless communication unit 510 or the external input/output unit 560 (for example, a wireless LAN), it can detect the position using the positional information.

The motion sensor unit 580 comprises, for example, a triaxial acceleration sensor and detects the physical movement of the smart phone 500 in response to an instruction from the main control unit 501. When the physical movement of the smart phone 500 is detected, the moving direction or acceleration of the smart phone 500 is detected. The detection result is output to the main control unit 501.

The power supply unit 590 supplies power which is stored in a battery (not illustrated) to each unit of the smart phone 500 in response to an instruction from the main control unit 501.

The main control unit 501 comprises a microprocessor, operates on the basis of the control program or control data stored in the storage unit 550, and controls the overall operation of each unit of the smart phone 500. The main control unit 501 has an application processing function and a mobile communication control function of controlling each unit of a communication system in order to perform voice communication or data communication through the wireless communication unit 510.

The application processing function is implemented by the operation of the main control unit 501 based on the application software which is stored in the storage unit 550. Examples of the application processing function include an infrared communication function which controls the external input/output unit 560 such that data communication with an opposing apparatus is performed, an electronic mail function which transmits and receives electronic mail, and a web browsing function which browses web pages.

The main control unit 501 has, for example, an image processing function which displays an image on the display input unit 520 on the basis of image data (still image or moving image data) such as received data or downloaded streaming data. The image processing function means the function of the main control unit 501 decoding the image data, performing image processing on the decoding result, and displaying the image on the display input unit 520.

The main control unit 501 performs display control for the display panel 521 and operation detection control for detecting the operation of the user through the operating unit 540 and the operation panel 522.

The main control unit 501 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 521.

The main control unit 501 performs the operation detection control to detect the operation of the user input through the operating unit 540, to receive an operation for the icon or the input of a character string to an input field of the window through the operation panel 522, or to receive a request to scroll the displayed image through the scroll bar.

In addition, the main control unit 501 has a touch panel control function that performs the operation detection control to determine whether the position of an operation for the operation panel 522 is an overlap portion (display region) which overlaps the display panel 521 or an outer edge portion (non-display region) which does not overlap the display panel 521 other than the overlap portion and controls a sensitive region of the operation panel 522 or the display position of the software key.

The main control unit 501 can detect a gesture operation for the operation panel 522 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 541 is a digital camera which captures an image using an imaging element, such as a complementary metal oxide semiconductor (CMOS) a charge-coupled device (CCD). The above-mentioned imaging device 10 can be applied to the camera unit 541. The imaging device 10 does not require, for example, a mechanical switching mechanism and can capture a wide-angle image and a telephoto image. Therefore, the imaging device 10 is preferable as a camera unit that is incorporated into a thin portable terminal such as the smart phone 500.

The camera unit 541 can convert captured image data into image data which is compressed in, for example, a Joint Photographic Coding Experts Group (JPEG) format and record the converted image data in the storage unit 550 or output the converted image data through the external input/output unit 560 or the wireless communication unit 510, under the control of the main control unit 501. As illustrated in FIG. 18, the camera unit 541 is mounted on the same surface as the display input unit 520 in the smart phone 500. However, the mounting position of the camera unit 541 is not limited thereto. For example, the camera unit 541 may be mounted on the rear surface of the display input unit 520 or a plurality of camera units 541 may be mounted. In a case in which a plurality of camera units 541 are mounted, the camera units 541 which are used to capture images may be switched such that a single camera unit captures images or the plurality of camera units 541 may be simultaneously used to capture images.

The camera unit 541 can be used for various functions of the smart phone 500. For example, the image captured by the camera unit 541 can be displayed on the display panel 521 or the image captured by the camera unit 541 can be used as one of the operation inputs of the operation panel 522. When the GPS receiving unit 570 detects the position, the position may be detected with reference to the image from the camera unit 541. In addition, the optical axis direction of the camera unit 541 in the smart phone 500 may be determined or the current usage environment may be determined, with reference to the image from the camera unit 541, using the triaxial acceleration sensor or without using the triaxial acceleration sensor. Of course, the image from the camera unit 541 may be used in the application software.

[Others]

The imaging device according to the invention can be used as, for example, an in-vehicle camera or a monitoring camera. However, the use of the imaging device is not limited thereto.

In the above-described embodiment, the pan/tilt mechanism that moves the direction of the optical axis of the telephoto optical system with respect to the direction of the optical axis of the wide-angle optical system uses the gimbal mechanism. However, the invention is not limited thereto. Any pan/tilt mechanism may be used as long as it can move the direction of the optical axis of the telephoto optical system independently of the wide-angle optical system.

In a case in which the telephoto optical system includes a reflective telephoto lens, the number of reflecting mirrors is not limited to two and three or more reflecting mirrors may be provided. In addition, an operator may set the tracking target object on the wide-angle image displayed on the display unit 44 at the beginning, using, for example, a touch panel.

In the imaging optical system according to this embodiment, of the wide-angle optical system and the telephoto optical system provided in different regions, one optical system is a circular central optical system and the other optical system is an annular optical system that is provided concentrically with the central optical system. However, the shape of the wide-angle optical system and the telephoto optical system is not limited to this embodiment and the wide-angle optical system and the telephoto optical system with various shapes are considered.

The invention is not limited to the above-described embodiments and various modifications and changes of the invention can be made without departing from the scope and spirit of the invention.

What is claimed is:

1. An imaging device comprising:

an imaging optical system including a wide-angle optical system and a telephoto optical system which are provided in different regions;

a directional sensor that includes a plurality of pixels including photoelectric conversion elements which are two-dimensionally arranged, pupil-divides light beams which are incident through the wide-angle optical system and the telephoto optical system, and selectively receives the light beams;

a pan/tilt mechanism that moves a direction of an imaging optical axis of the telephoto optical system with respect to a direction of an imaging optical axis of the wide-angle optical system; and an image acquisition unit that acquires a wide-angle image received from the directional sensor through the wide-angle optical system and a telephoto image received from the directional sensor through the telephoto optical system, wherein the wide-angle optical system of the imaging optical system is a circular central optical system and the telephoto optical system of the imaging optical system is an annular optical system that is provided concentrically with the central optical system and includes a reflection optical system that reflects the light beam two or more times, wherein the reflection optical system of the telephoto optical system includes at least a main reflection optical system that reflects the light beam and a sub-reflection optical system that further reflects the light beam reflected by the main reflection optical system, and the pan/tilt mechanism tilts the main reflection optical system with respect to a light receiving surface of the directional sensor in directions of rotation about two orthogonal axes and tilts the sub-reflection optical system by an angle that is half of a tilt angle of the tilted main reflection optical system.

2. The imaging device according to claim 1, further comprising:

an object detection unit that detects a tracking target object on the basis of at least the wide-angle image, of the wide-angle image and the telephoto image acquired by the image acquisition unit; and a pan/tilt control unit that controls the pan/tilt mechanism on the basis of positional information of the object detected by the object detection unit in an image.

3. The imaging device according to claim 2, wherein the object detection unit detects a moving body on the basis of the wide-angle images which are continuously acquired by the image acquisition unit and uses the detected moving body as the tracking target object.

4. The imaging device according to claim 2, wherein the object detection unit recognizes a specific object on the basis of the wide-angle image acquired by the image acquisition unit and uses the recognized specific object as the tracking target object.

5. The imaging device according to claim 2, wherein the pan/tilt control unit controls the pan/tilt mechanism on the basis of the positional information of the object detected by the object detection unit in the image such that the detected object is at least within an angle of view of the telephoto image.

6. The imaging device according to claim 3, wherein the pan/tilt control unit controls the pan/tilt mechanism on the basis of the positional information of the object detected by the object detection unit in the image such that the detected object is at least within an angle of view of the telephoto image.

7. The imaging device according to claim 4, wherein the pan/tilt control unit controls the pan/tilt mechanism on the basis of the positional information of the object detected by the object detection unit in the image such that the detected object is at least within an angle of view of the telephoto image.

8. The imaging device according to claim 1, further comprising:

a recording unit that records at least the telephoto image, of the wide-angle image and the telephoto image acquired by the image acquisition unit.

9. The imaging device according to claim 2, further comprising:

a recording unit that records at least the telephoto image, of the wide-angle image and the telephoto image acquired by the image acquisition unit.

10. The imaging device according to claim 3, further comprising:

a recording unit that records at least the telephoto image, of the wide-angle image and the telephoto image acquired by the image acquisition unit.

11. The imaging device according to claim 4, further comprising:

a recording unit that records at least the telephoto image, of the wide-angle image and the telephoto image acquired by the image acquisition unit.

12. The imaging device according to claim 5, further comprising:

a recording unit that records at least the telephoto image, of the wide-angle image and the telephoto image acquired by the image acquisition unit.

13. The imaging device according to claim 6, further comprising:

a recording unit that records at least the telephoto image, of the wide-angle image and the telephoto image acquired by the image acquisition unit.

14. The imaging device according to claim 7, further comprising:

a recording unit that records at least the telephoto image, of the wide-angle image and the telephoto image acquired by the image acquisition unit.

15. The imaging device according to claim 1, further comprising:

a focus adjustment unit that adjusts a focus of the telephoto optical system.

16. The imaging device according to claim 2, further comprising:

a focus adjustment unit that adjusts a focus of the telephoto optical system.

17. The imaging device according to claim 3, further comprising:

a focus adjustment unit that adjusts a focus of the telephoto optical system.

18. The imaging device according to claim 4, further comprising:

a focus adjustment unit that adjusts a focus of the telephoto optical system.

19. The imaging device according to claim 5, further comprising:

a focus adjustment unit that adjusts a focus of the telephoto optical system.

20. The imaging device according to claim 1, wherein the directional sensor includes a microlens array that functions as a pupil division unit or a light shielding mask.

* * * * *